United States Patent [19]

Hutchins

[11] Patent Number: 4,651,418

[45] Date of Patent: Mar. 24, 1987

[54] METHODS OF AND APPARATUS FOR ASSEMBLING CONTACT ELEMENTS TO CONNECTOR HOUSING

[75] Inventor: Erle M. Hutchins, Bel Air, Md.

[73] Assignee: AT&T Technologies, Inc., Berkeley Heights, N.J.

[21] Appl. No.: 645,182

[22] Filed: Aug. 29, 1984

[51] Int. Cl.⁴ .......................... H01R 43/00; B23P 19/00; B65H 23/04

[52] U.S. Cl. .......................... 29/884; 29/747; 226/196; 242/76; 269/903; 339/154 R

[58] Field of Search .......................... 29/882, 747, 884, 876; 339/154; 269/902, 903; 242/76; 226/196

[56] References Cited

U.S. PATENT DOCUMENTS

| | | | |
|---|---|---|---|
| 3,409,972 | 11/1968 | Cervenka et al. | |
| 3,556,166 | 1/1971 | Whitney | 140/71 |
| 3,562,903 | 2/1971 | Busler et al. | 29/602 |
| 3,699,498 | 10/1972 | Hardesty et al. | 339/64 M |
| 3,761,869 | 9/1973 | Hardesty et al. | 339/99 R |
| 4,241,974 | 12/1980 | Hardesty | 339/176 M X |
| 4,243,332 | 1/1981 | Hartmann | 269/902 X |
| 4,267,908 | 1/1983 | Johnston | 339/154 A |
| 4,268,109 | 5/1981 | Hardesty | 339/205 |
| 4,289,558 | 9/1981 | Eichenbaum et al. | 226/196 X |
| 4,292,736 | 10/1981 | Hughes | 29/884 |
| 4,296,550 | 10/1981 | Kobler | 29/884 |
| 4,379,609 | 4/1983 | Hardesty | 339/91 R |
| 4,392,373 | 7/1983 | Clark | 72/321 |
| 4,488,355 | 12/1984 | Hutchins et al. | 29/882 |

*Primary Examiner*—Howard N. Goldberg
*Assistant Examiner*—Carl J. Arbes
*Attorney, Agent, or Firm*—E. W. Somers

[57] ABSTRACT

A plurality of lengths (52—52) of wires (54—54) are advanced along parallel paths and clamped after which each length is formed into a retroflexed configuration at a wire-forming station (50). The partially formed lengths of wire are stored in a nest of a transport device (115) and severed from supplies (56—56) of the wires. Then the transport device is moved to deliver the partially formed wires from the wire-forming station to an assembly station (60). Forces are applied to the partially formed wires to hold an upper portion of each compressed toward a lower portion to allow end portions of each to be moved into guide channels of a plastic housing (32) having a plug end (34) and a jack end (36) which includes stacked cavities (38, 39). Portions of tooling (241,242) inserted into the jack end provide guide paths for the end portions of the wires during their movement into the housing and to the jack end. Portions (251,258) of the tooling are activated to cause each free end portion of each wire length to be retroflexed and disposed in one of the cavities.

28 Claims, 40 Drawing Figures

Fig_4A
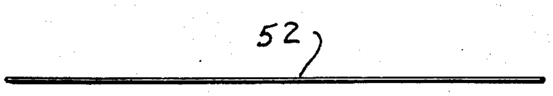
Fig_4B
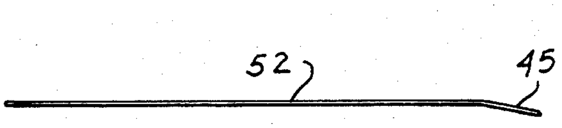
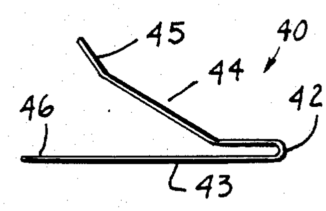
Fig_4C
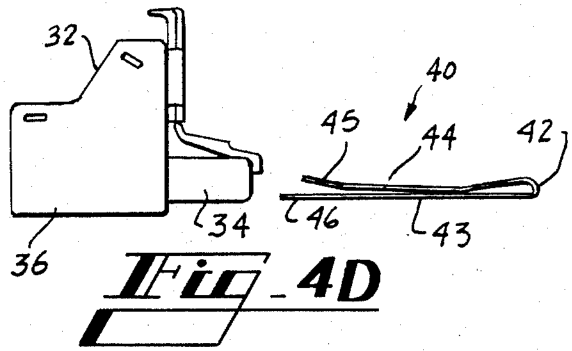
Fig_4D
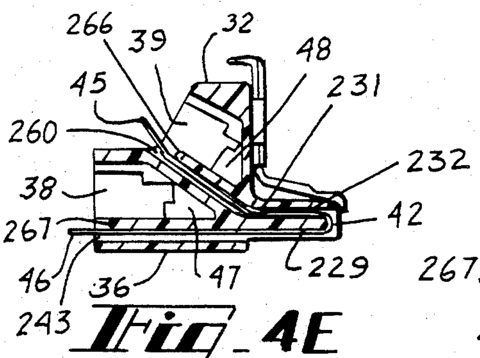
Fig_4E
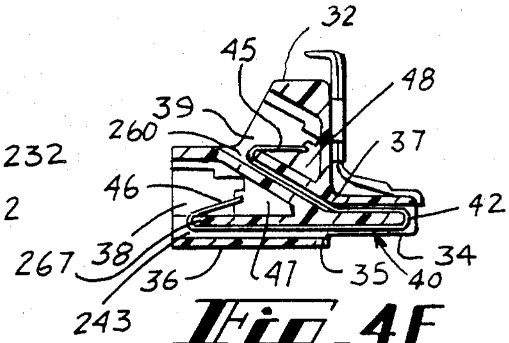
Fig_4F
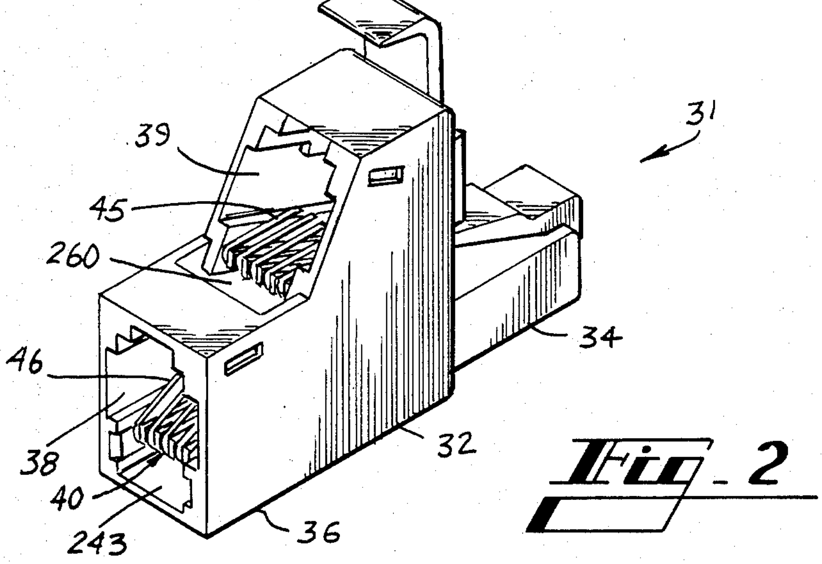
Fig_2

METHODS OF AND APPARATUS FOR ASSEMBLING CONTACT ELEMENTS TO CONNECTOR HOUSING

TECHNICAL FIELD

This invention relates to methods of and apparatus for assembling contact elements to a connector housing. More particularly, the invention relates to methods and apparatus for forming metallic contact elements and for inserting those elements into a dielectric unipartite housing having a plug end and two cavities at an opposite jack end.

BACKGROUND OF THE INVENTION

Modular plugs, which are used to terminate retractile cords that connect a telephone base to a handset, provide a customer as well as an installer with the capability of easily changing cords by removing the plugs from jacks in the base and handset and then reinstalling a new or refurbished cord. Newly obtained telephones are easily connected to existing wall terminals by inserting a modular plug which terminates one end of a line cord into a jack in the telephone base and the plug at the other end of the cord in the wall terminal.

Modular plugs for terminating telephone cords are shown, for example, in U.S. Pat. Nos. 3,699,498 and 3,761,869 which issued Oct. 17, 1972 and Sept. 24, 1973, respectively, both in the names of E. C. Hardesty, C. L. Krumreich, A. E. Mulbarger, Jr., and S. W. Walden. Jacks which are adapted to receive modular plugs that terminate new style flat telephone cords are shown for example in U.S. Pat. Nos. 3,850,497 and 3,990,764, the latter two patents being issued on Nov. 26, 1974 and Nov. 9, 1976, respectively.

A jack which is provided in the wall terminal usually includes a single outlet for connecting a station instrument such as, for example, the telephone set to an associated telephone line. However, there are some situations in which it is desirable to be able to connect two station instruments such as, for example, a telephone answering device and an adjacent telephone set in parallel to the associated telephone line at the same location. There are other situations where it may be desirable also to be able to connect an auxiliary power supply to telephone station equipment to provide, for example, power to an incandescent lamp mounted within a telephone set for illuminating a dial or an array of pushbuttons.

An adapter which provides multiple access to a telephone line at a single wall terminal is shown in U.S. Pat. No. 4,241,974 which issued on Oct. 30, 1980 in the name of E. C. Hardesty. The adapter includes a dielectric unipartite housing having a plug end for insertion into a wall terminal and an opposite jack end. Each of a pair of externally communicating cavities at the jack end is adapted to receive a modular plug that is used to terminate a telephone cord and that includes a plurality of spaced, parallel terminals. The plug end which is adapted to be received in a jack cavity of a wall terminal includes a plurality of spaced wire-receiving channels which communicate and which are aligned with spaced wire-receiving channels in each of the cavities at the jack end. A wire-like contact element is mounted in each of the channels of the plug end and has a retroflexed configuration with one free end portion of each contact element extending into the aligned channel in one of the cavities and with the other free end portion extending into the associated aligned channel in the other one of the cavities.

The contact elements must be formed and assembled to the housing in a manner which facilitates high speed production. Considering the geometry of the adapter and its one-piece construction, it should be apparent that the assembly of the contact elements to the housing is a formidable task.

The prior art of forming and assembling wire-like contact elements to a modular connector housing includes commonly assigned application Ser. No. 393,991, filed on June 30, 1982 in the name of E. M. Hutchins and W. M. Schoenemann, Jr. In it, a coupler housing includes opposing cavities and contact elements which extend between the cavities and which have retroflexed end portions in the opposing cavities. The contact elements are formed by feeding a plurality of wires side by side into the housing, forming the wire end portions in one cavity, severing the wires from supplies and then forming the opposite end portions in the other cavity.

Although the prior art includes methods and apparatus for assembling contact elements to a housing having opposed cavities, it seemingly does not include methods and apparatus for assembling contact elements to a housing of the type described for the adapter. Not only are both free end portions of the contact elements at the same end of the adapter housing, but each contact element must be retroflexed at an opposite end of the housing and at each of its end portions.

SUMMARY OF THE INVENTION

The foregoing problems of the prior art are overcome by the methods and apparatus of this invention. In a method of assembling a wire-like like contact element and a dielectric, unipartite housing having an opening in a first end which communicates with a cavity in a second end, a straight length of wire extending from a supply is fed into a wire-forming station. In the wire forming station, a portion of the length of wire which includes a leading free end is turned to provide a partially formed contact element having a retroflexed configuration, after which the partially formed contact element is stored in a nest. The partially formed contact element is separated from the supply to cause the partially formed contact element to have a trailing free end. Then the partially formed contact element in the nest is caused to be aligned with the housing with the leading and trailing free ends of the partially formed contact element facing the first end of the housing. The partially formed contact element is moved out of the nest into the first end of the housing and farther therein to cause at least one free end portion of the partially formed contact element to be disposed adjacent to the second end of the housing. The at least one free end portion is caused to have a predetermined configuration and to be disposed in the cavity at the second end of the housing.

In a preferred embodiment, an apparatus for forming a plurality of wire-like contact elements and for assembling the contact elements to a plastic housing which includes a plug end and an opposite jack end having two cavities includes feeding facilities for moving a plurality of straight lengths of wire extending from supplies into a wire-forming station. A forming device is provided at the wire-forming station for turning a portion of each length of wire which includes a leading free end to provide partially formed contact elements each having a retroflexed configuration. A transport device having a nest is adapted to receive the partially formed contact elements and to move them from the wire-forming station to an assembly station. Facilities are provided for separating the partially formed contact elements from the supplies of wire to cause each partially formed contact element to have a trailing free end adjacent to the leading free end. A socket holds the housing in the assembly station and the transport device is moved to cause the partially formed contact elements to be aligned with the housing with the plug end of the housing facing the free ends of each partially formed contact element. Pushing facilities responsive to the positioning of a housing and the transport device in the assembly station are provided for moving the contact elements from the nest into the aligned housing. A first wire end forming device supports the trailing free end portions of the partially formed contact elements as the contact elements are moved through the housing and causes each trailing end portion to be retroflexed and disposed in one of the cavities. A second wire end forming device is provided for supporting the leading free end portions of the partially formed contact elements as the contact elements are moved through the housing and for causing each leading free end portion to be retroflexed and disposed in the other cavity.

BRIEF DESCRIPTION OF THE DRAWINGS

Other features of the present invention will be more readily understood from the following detailed description of specific embodiments thereof when read in conjunction with the accompanying drawings, in which:

FIG. 2 is a perspective view of the modular adapter;

FIGS. 4A-4F are a sequence of views depicting a method of forming a contact element and assembling it to the housing to form the adapter;

DETAILED DESCRIPTION

Figure 1:
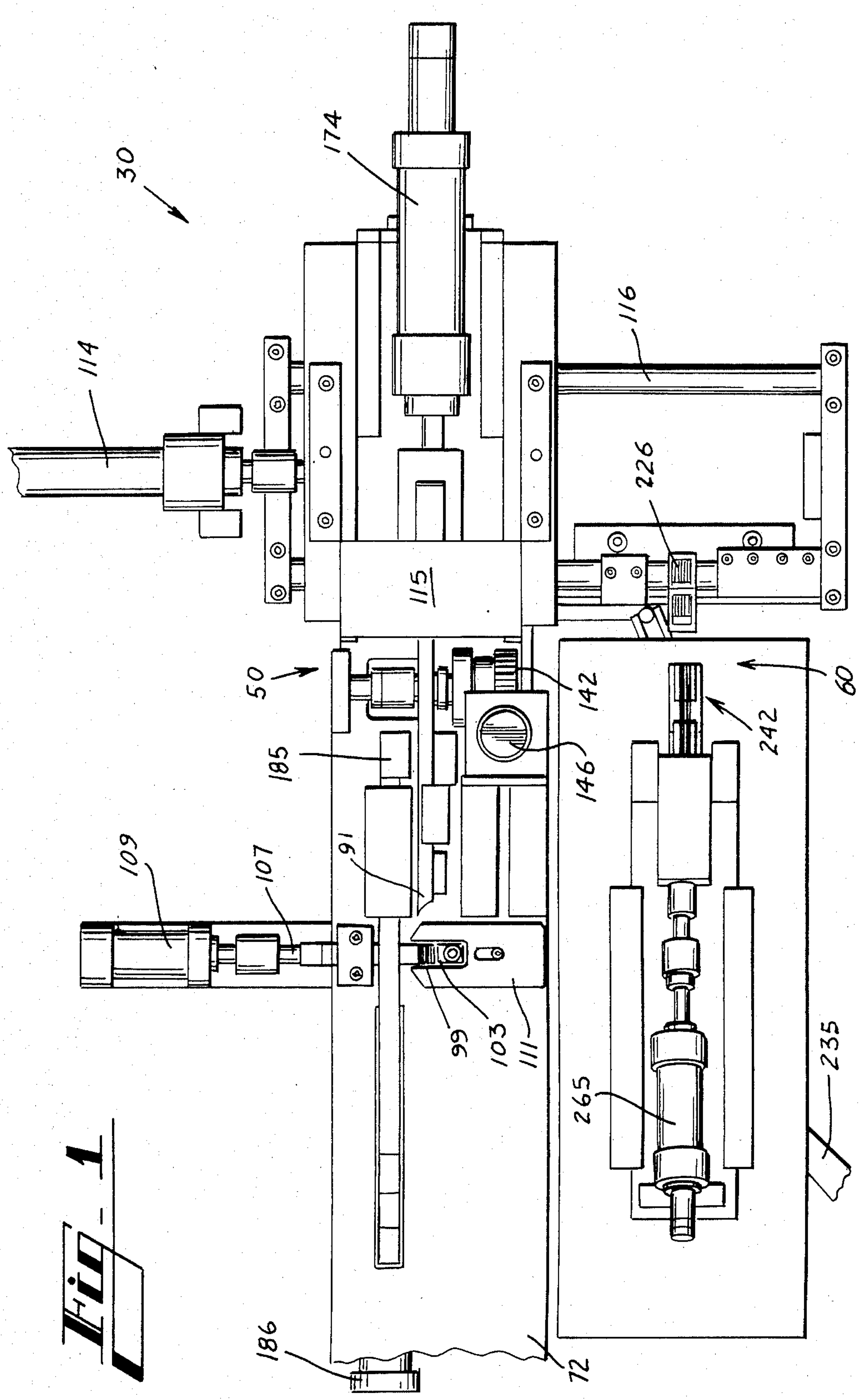
FIG. 1 is a plan view of an apparatus of this invention for forming and assembling contact elements to a housing to provide a modular adapter.
Figure 2A:
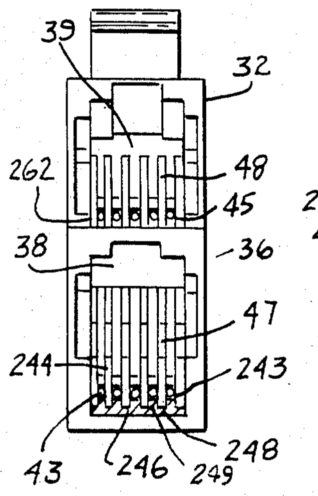
FIGS. 2A-2B are end views of a housing of the adapter after partially formed wire lengths have been inserted but prior to end forming thereof.

Referring now to FIG. 1, there is shown an apparatus designated generally by the numeral 30 for assembling an adapter 31 (see FIG. 2) which is disclosed and claimed in previously identified U.S. Pat. No. 4,241,974 which is incorporated by reference hereinto. The adapter 31 includes a unipartite housing 32 which has a first or plug end 34 and a second or jack end 36 (see FIGS. 2A and 2B) and which is made of a suitable dielectric material such as polycarbonate, for example. The jack end 36 includes stacked jack cavities 38 and 39 which communicate through passageways 35 and 37 (see FIG. 4F) with the plug end. A plurality of wire-like metallic contact elements 40-40 are disposed in the housing 32. Each of the contact elements 40-40 has a retroflexed configuration which includes a closed end portion 42 and legs 43 and 44 (see FIG. 4C). The closed end portion is disposed at the plug end 34. The legs 44 and 43 extend from the closed end portion to free end portions 45 and 46, respectively, which are retroflexed and which are disposed in the jack cavities 39 and 38, respectively. Further, the free ends of the contact elements are disposed between ribs 47-47 and ribs 48-48 in the cavities 38 and 39, respectively.

The methods and apparatus of this invention are used to form partially the contact elements 40-40, to insert the partially formed contact elements into the housing 32 and then to complete the forming. The apparatus 30 includes a wire-forming station 50 (see FIGS. 1 and 3)

whereat straight leading end lengths 52-52 (see FIG. 4A) of a plurality of wires 54-54 extending from supplies 56-56 are formed partially into contact elements (see FIGS. 4B and 4C). Each length 52 includes a leading free end portion 45 which is destined to be retroflexed. The partially formed lengths 52-52 are separated from the supplies to provide trailing end portions 46-46 which are destined to be retroflexed and transported to a second station. At the second station, which is identified generally by the numeral 60 and which is referred to as the assembly station, the partially formed wires are aligned with a housing 32 (see FIG. 4D). Then the partially formed contact elements 40-40 are assembled to the housing (see FIG. 4E) and the free end portions formed further (see FIG. 4F).

Figure 3:
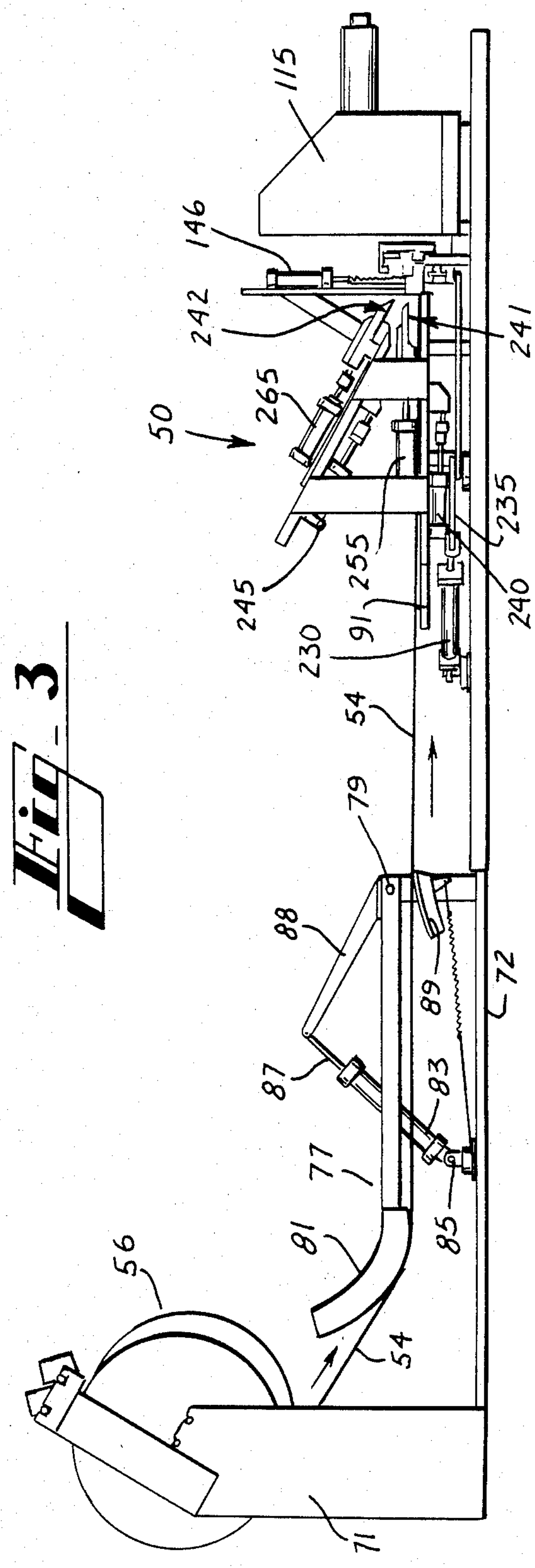
FIG. 3 is an elevational view of the apparatus of FIG. 1.
Figure 5:
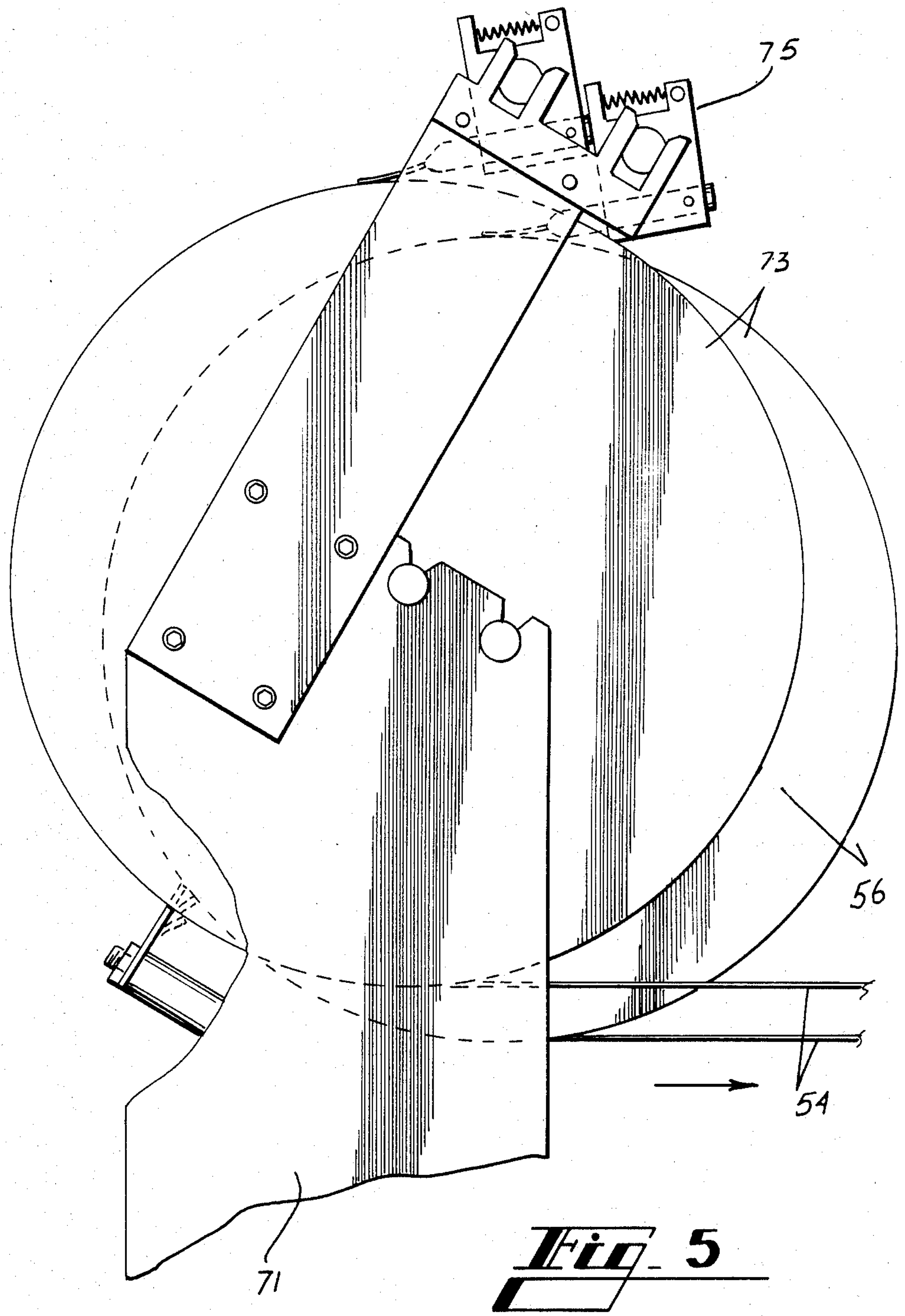
FIG. 5 is an elevational view of a portion of a wire-feed arrangement of the apparatus of FIG. 1.

Referring now to FIGS. 3 and 5, it can be seen that the supplies 56-56 of wires 54-54 are mounted rotatably on a stand 71 supported on a base 72. Each of the supplies 56-56 comprises a plastic reel 73 on which are wound a plurality of convolutions of the wire 54. As viewed in FIG. 5, the reels 73-73 are turned in a counter-clockwise direction as the wires are pulled therefrom. Also, each of the reels 73-73 is provided with a brake 75 which is adjusted to control the turning of the reels and the tension in the wires 54-54.

Cooperating with the brakes 75-75 is a slack paddle 77 (see FIG. 3) which is rotatably mounted about an axis 79. It includes an arcuately shaped portion 81 which is designed to engage the wires 54-54 extending from the supplies 56-56 to the wire-forming station 50. The paddle 77 is turned rotatably by an air cylinder 83 which is pin mounted at a pedestal 85 and which has a piston rod 87 pin-connected to a lever 88 which is attached to the rotatably mounted end of the slack paddle.

Figure 6:
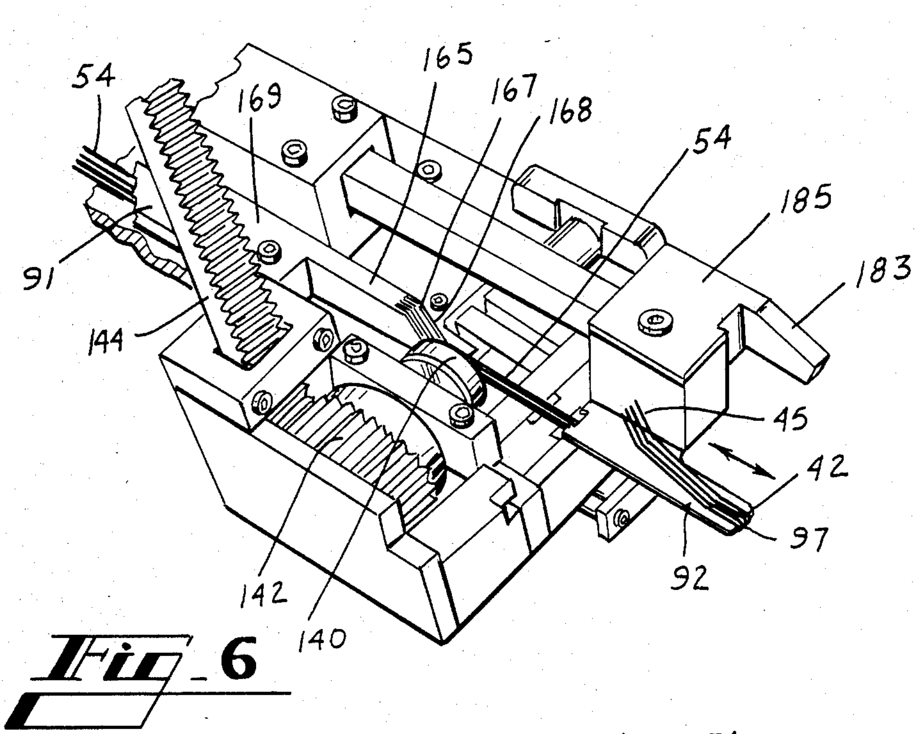
FIG. 6 is a perspective view of a portion of a wire-forming station.

The slack paddle 77 is used to cause the wires 54-54 to assume an arcuate configuration between the reels 73-73 and a curved plate 89 which is aligned with a grooved trackway 91 (see FIGS. 1 and 6) along which the wires extend to the wire-forming station 50. This is necessary so that when the paddle 77 is disengaged from the wires 54-54, there is an amount of slack between the supplies 56-56 and the trackway 91. After each of the wire lengths 52-52 has been formed into a retroflexed configuration, a feed member 92 (see FIG. 6) which is slidably mounted on the trackway 91 engages the closed end portions 42-42 to move the partially formed contact elements out of the forming station 50 for movement to the assembly station 60. Without the slack in each of the wires 54-54, the feeding of the partially formed contact elements 40-40 could result in forces being applied to the closed end portions 42-42 which are sufficient to cause the wires to rotate about the feed member 92. This could occur, for example, if the wires 54-54 become jammed on the reels 73-73 with convolutions slipped between other convolutions and the reel sides. The paddle 77 provides sufficient slack in each wire 54 to prevent turnout of the closed end portions 42-42.

The apparatus 30 is designed to maintain the spacing between the wires 54-54 and the lengths 52-52 of the wires at each step of the method. For example, the grooved trackway 91 maintains the spacing between the wires 54-54. After the wires 54-54 leave the trackway 91, they pass into grooves 97-97 on the underside of the feed member 92 and extend to the wire-forming station 50.

Between the paddle 77 and the grooves 97-97, the wires 54-54 extend between a plurality of leaves 99-99 (see FIGS. 1 and 7–8) which project upwardly from a base 96 of a wire clamping device 98 to form passageways 101-101 therebetween. The leaves 99-99 are made from a relatively thin metallic material which provides flexibility in a direction transverse of the wires 54-54. On one side of the leaves 99-99 there is located a back-up member 103 which is mounted pivotally about a pin 105. On the other side of the leaves 99-99 is disposed a slidably moveable rod 107. The rod 107 which is horizontally disposed is adapted to be moved by an air cylinder 109. When the air cylinder 109 is operated to extend its piston rod, it causes forces to be applied by the rod 107 to the leaves 99-99 to clamp the wires 54-54 therebetween. Because the backup member 103 is mounted pivotally, it self-adjusts to insure parallelism between the passageways 101-101 provided between the leaves.

Figure 7:
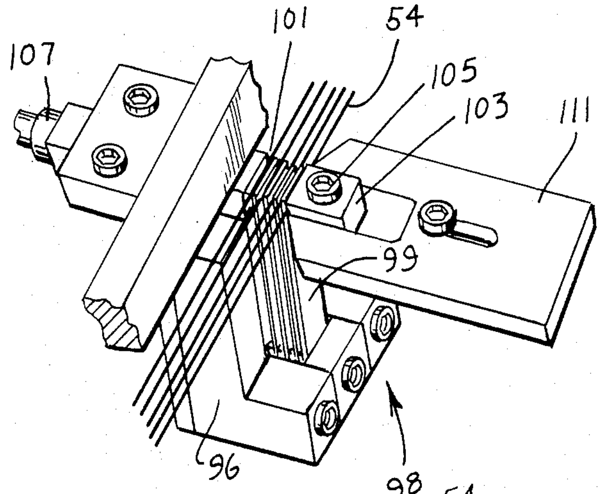
FIG. 7 is a perspective view of facilities for clamping a plurality of wires being fed to the wire-forming station.
Figure 9:
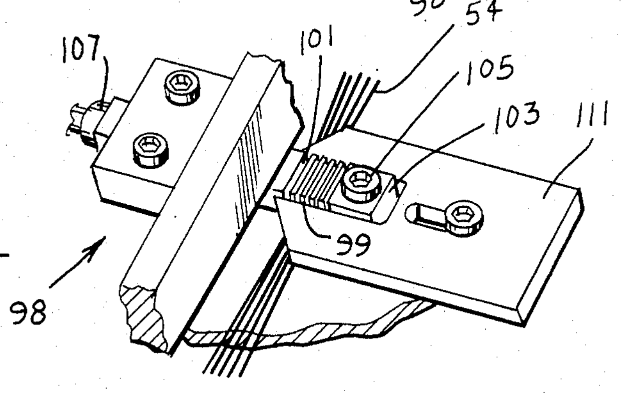
FIG. 9 is a perspective view of the clamping facilities of FIG. 7 after a wire-stabilizing portion has been actuated.

Viewing FIG. 7, it is seen that the back-up member 103 is straddled by a U-shaped member 111. After the wires 54-54 have been strung up in the apparatus 30 and prior to being fed toward the wire-forming station 50, the U-shaped member 111 is moved to cause it to straddle the wires 54-54 (see FIG. 9). This insures that the wires 54-54 lie in a plane when they are clamped by the cooperation among the rod 107, the back-up member 103 and the leaves 99-99. It should be clear that the normal operating position for the U-shaped member 111 is that shown in FIG. 9.

Figure 8:
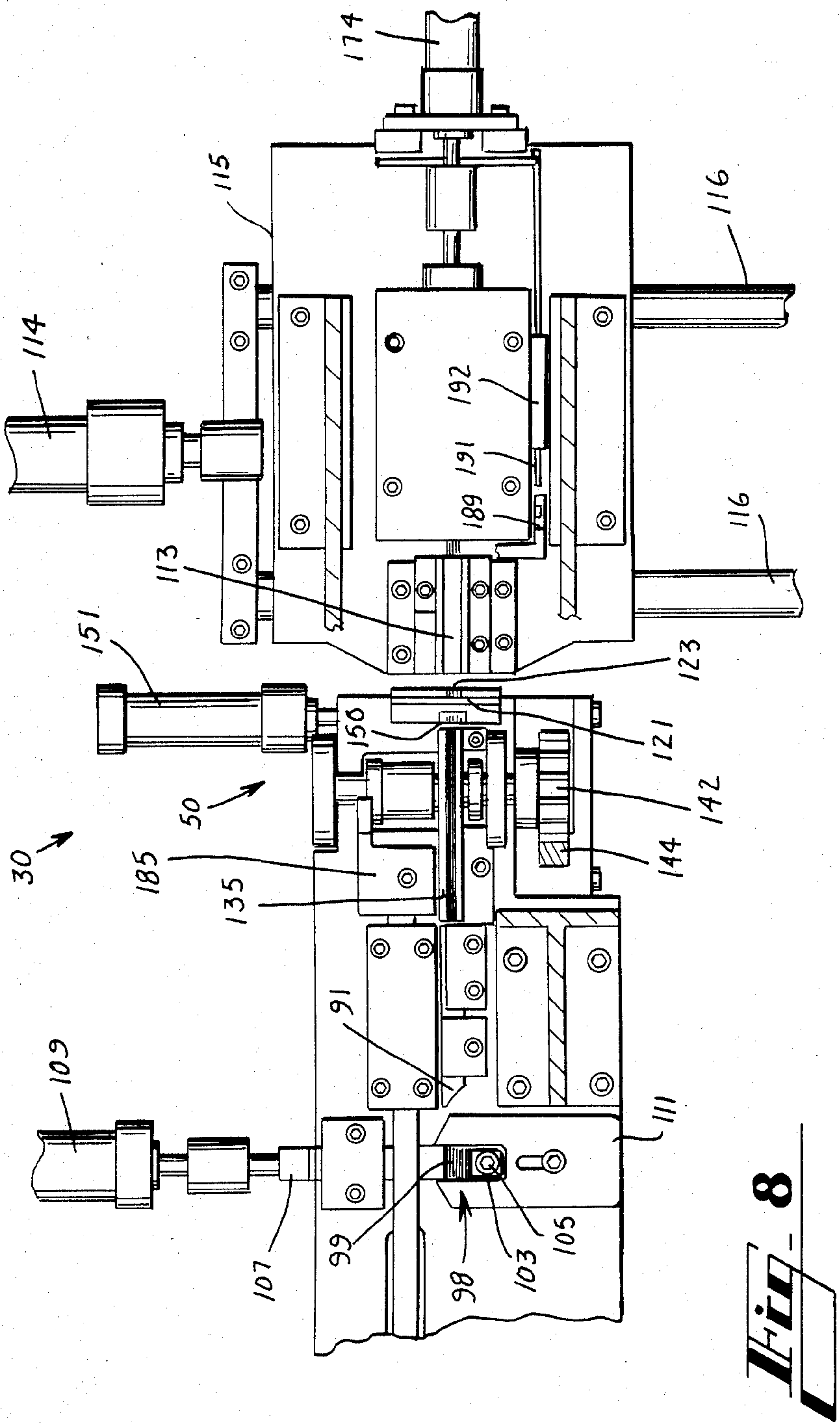
FIG. 8 is a plan view of the wire-forming station and of a transport device as it is positioned in the wire-forming station.

Forward of the wire-clamping device 98 is the wire-forming station 50 (see FIGS. 1 and 8). The wire-forming station 50 includes facilities for forming each of a plurality of lengths of the side-by-side wires 54-54 partially into the configurations shown in FIGS. 4B and 4C. Afterwards, the partially formed wires are moved into a nest 113 of a wire-transport device 115 which is slidably mounted on rails 116-116. The transport device 115 is adapted to be moved by an air cylinder 114 between the wire-forming station 50 where the wires are formed and the assembly station 60 where they are inserted into the plastic housing 32 and formed further.

Assume now that the legs 43-43 of the contact elements, partially formed into the configuration shown in FIG. 4C in a previous cycle of operation, have been moved into grooves 117-117 (see FIG. 10) of a bed plate 118 of the transport nest 113. These partially formed contact elements are still connected to the supplies 56-56 and bridge between the transport device 115 and the forming station 50. The wires 54-54 extend along the grooves 97-97 in the underside of the feed member 92, and over an opening 119, an inclined surface 121 and above teeth 122 of a comb 123. The air cylinder 109 (see FIG. 8) is operated to cause the rod 107 to be moved to move the leaves 99-99 toward each other to clamp the wires 54-54 therebetween.

Then an overhead member 125 (see FIGS. 10 and 11) which is mounted on a toggle mechanism 126 is actuated to cause it to be moved downwardly by the operation of an air cylinder 128. The overhead member 125 includes a shearing blade 127 and a forming member 129. As the overhead member 125 is operated and moved downwardly, the shearing blade 127 cooperates with an edge of a lip 130 of the bed plate 118 of the transport device 115 to sever the partially formed contact elements now within the nest in the transport device from the supplies 56-56. This causes each wire in the nest 113 to have a trailing free end portion 46 and each of a plurality of lengths of wire in the forming station to have a leading end portion 45. Also, the forming member 129 cooperates with the inclined surface 121 to cause the portion 45 (see FIGS. 4B and 10) of each wire 54 to be turned downwardly into engagement with the inclined surface.

Figure 14:
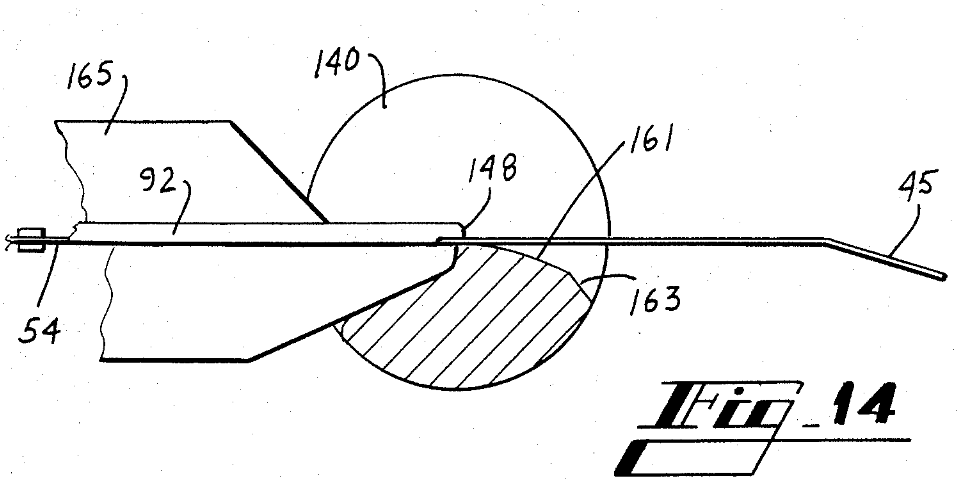
FIG. 14 is a schematic view of a length of wire in position for being formed into a retroflexed configuration.
Figure 15:
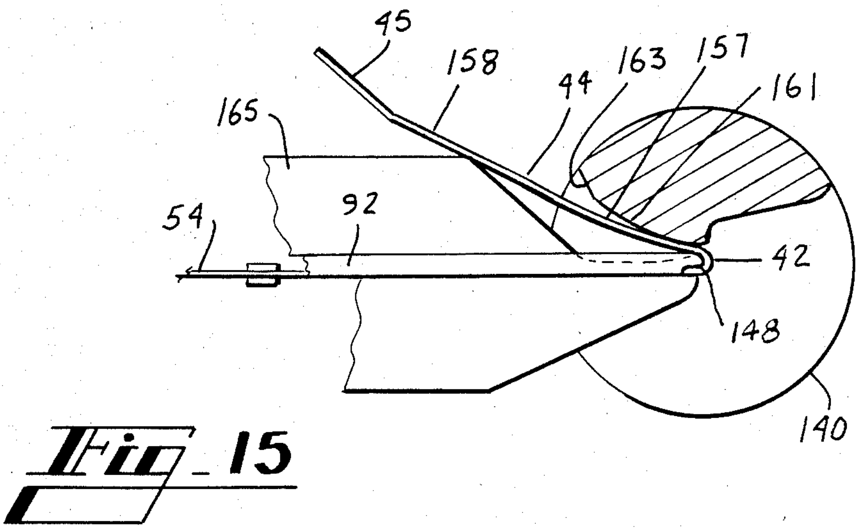
FIG. 15 is an enlarged view of a shaft of the wire-forming station as the length of wire is being caused to assume a retroflexed configuration.
Figure 16:
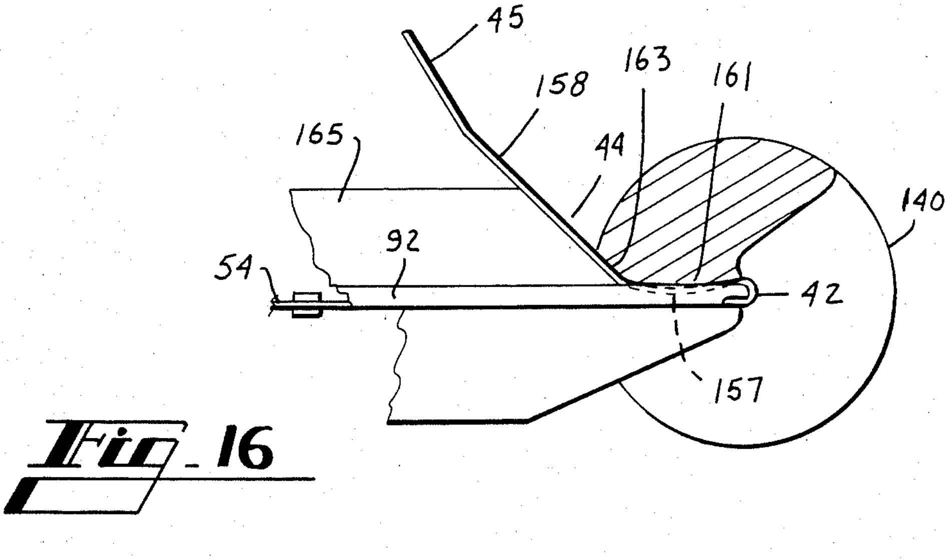
FIG. 16 is a view of the shaft of FIG. 15 in its fully operated position.

The apparatus 30 now is controlled to cause each of the wire lengths in the forming station having the newly formed leading end portions 45-45 to be formed into the retroflexed configuration shown in FIG. 4C having a closed end portion 42. In order to guide the wires 54-54 as portions thereof are turned, the apparatus 30 includes a laminated wire guide 135 (see FIGS. 12 and 13). The wire guide 135 includes a plurality of partitions 136-136 which are maintained apart by spacers 137-137. The laminated wire guide 135 extends forward to one side of the opening 119. A lower portion of the wire guide 135 is removed to form a semi-circular opening 139. This opening 139 permits rotation of a forming shaft 140 (see FIGS. 13 and 14) having a horizontally disposed axis 141 (see FIG. 10). The shaft 140 is designed to cooperate with the feed member 92 to provide each length of wire with a retroflexed configuration. The shaft 140 is attached to a gear wheel 142 (see FIGS. 1 and 11) which is intermeshed with a rack 144. As the rack 144 is moved downwardly by an air cylinder 146, the gear wheel 142 is caused to be turned. This causes the shaft 140 to be turned to rotate the leading portion of each wire 54 about a curved nose portion 148 (see FIG. 15) of the feed member 92. The rotation of the shaft 140 is discontinued when it reaches the position shown in FIG. 16.

Figure 18:
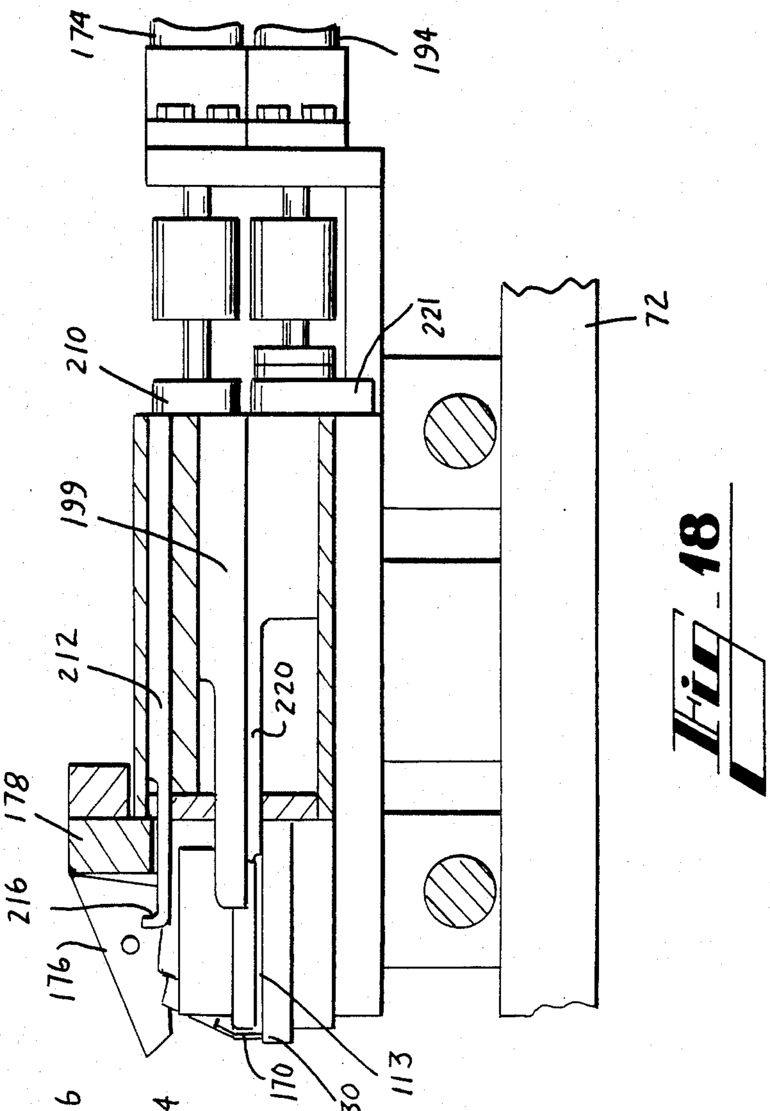
FIG. 18 is an elevational view of portions of the transport device.
Figure 17:
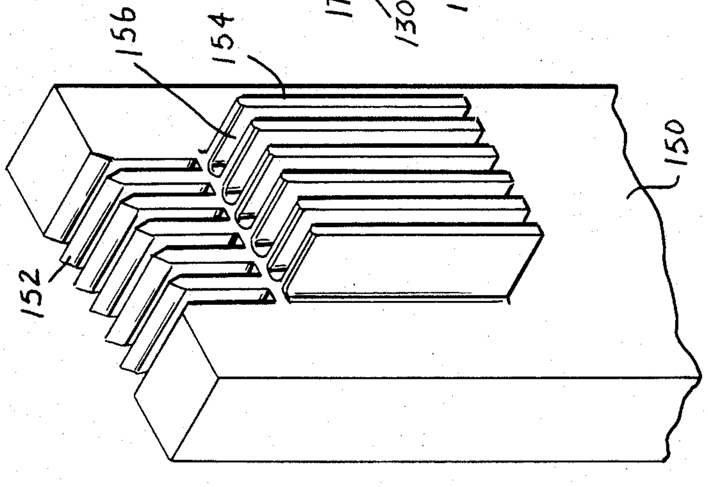
FIG. 17 is an enlarged perspective view of a wire guide slide in the wire-forming station.

Provisions must be made for insuring that the leading end portions 45-45 of the wire lengths 52-52 are received between the partitions 136-136 of the wire guide 135 as the shaft 140 is turned. This is accomplished by a wire guide slide 150 (see FIGS. 10, 13 and 17) which is disposed in the opening 119. As can be seen, the wire guide slide 150 includes a plurality of teeth 152-152 formed along an upper edge. Before the wires 54-54 have been severed from the partially formed wires in the transport nest 113 (see FIG. 18), the feed member 92 is retracted to a first return position (see FIG. 10) and the slide 150 is caused to be moved upwardly by an air cylinder 151 (see FIG. 8) through a toggle mechanism 153 (see FIG. 11) to cause each wire 54 to be received between two of the teeth 152-152 (see FIG. 13). The feed member 92 is effective to maintain the registration of the wires during the upward movement of the slide 150. During the shearing of the wires 54-54, the wires are maintained in the predetermined registration because they are positioned between the teeth 152-152 of the wire guide slide 150 and in the grooves 117-117 of the bed plate 118. While the wires 54-54 are being sheared, the feed member 92 is returned to a second position to allow the lengths 52-52 to be formed into a retroflexed configuration. The slide 150 is moved further upwardly to insure receipt of the wires between the partitions 136-136 in the laminated wire guide 135 preparatory to the operation of the shaft 140. It should be apparent from FIG. 10 that the feed member 92 is shown in a position where it has carried a partially formed contact element 40 into the transport device 115 and that a next successive length 52 is separated therefrom after the retraction of the feed member.

Figure 13:
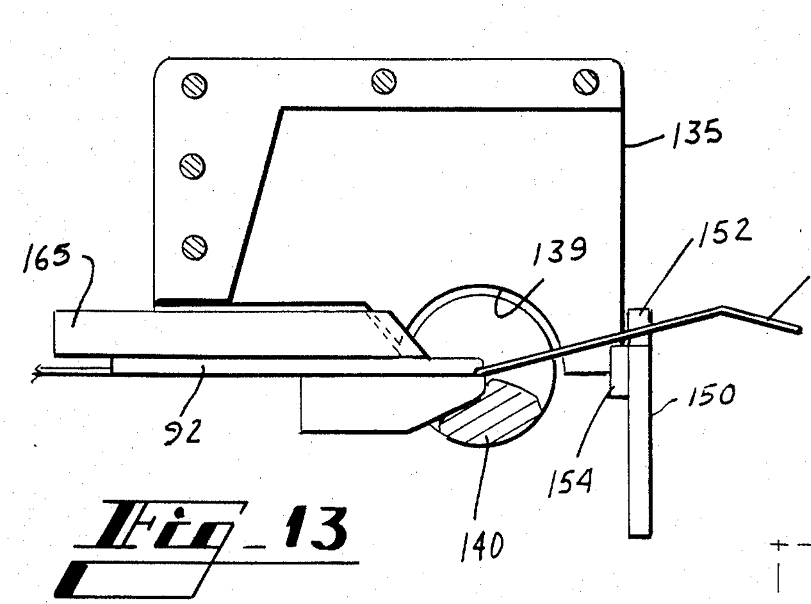
FIG. 13 is a side elevational view of the laminated wire guide of FIG. 12 taken along lines 13—13 thereof together with other portions of the wire-forming station.

As is apparent from FIG. 13, the guide slide 150 is disposed outside the laminated wire guide 135. Projecting horizontally and inwardly toward the semicircular opening 139 are a plurality of ribs 154-154 (see also FIG. 17) having chamfered edges 156-156. The ribs 154-154 which are adapted to be received between the partitions are adapted to support the wires 54-54 and cause them to be moved between the partitions 136-136. The chamfered edges 156-156 facilitate entry of the ribs between the partitions of the laminated wire guide 135 to hold the correct spacing of the partitions 136-136 during the wire forming.

The shaft 140 is contoured (see FIGS. 14–16) to cause the retroflexed portion of each wire 54 to be formed with a portion 157 that is parallel to the wire extending to its supply with a portion 158 that extends angularly therefrom and the portion 45 that extends angularly from the portion 158. A surface 161 (see FIG. 14), which is arcuately formed, extends from the vicinity of the axis of the shaft outwardly and is joined to another generally flat surface 163 that joins to the periphery of the shaft 140. As the shaft 140 is turned by the rack 144 and gear wheel 142 with the nose end 148 of the feed member 92 approximately at the center of the shaft, portions of the wires 54-54 are caused to be curled about the feed member (see FIG. 16). This causes each wire to assume the retroflexed configuration shown in FIG. 4C. The arcuate configuration of the surface 161 is such that it imparts a set-free, over-formed shape to a portion of each wire length 52 (see FIG. 16). The springback capability of the wire facilitates the return of that portion of the wire to the configuration shown in FIG. 4C.

The forming of the lengths 52-52 is assisted by another wire guide 165 (see FIGS. 6 and 13) having a slotted end 167. It is cantilevered from a supporting portion 169 and is aligned with the feed member 92. The partitions 136-136 of the laminated wire guide 135 are received between ribs 168-168 which define the slotted end 167. As the shaft 140 is caused to be rotated, the end portions 158-158 of the wires which are out of engagement with the shaft come to rest in engagement with the leading ends of the ribs 168-168 of the slotted end 167 of the wire guide 165.

Figure 19:
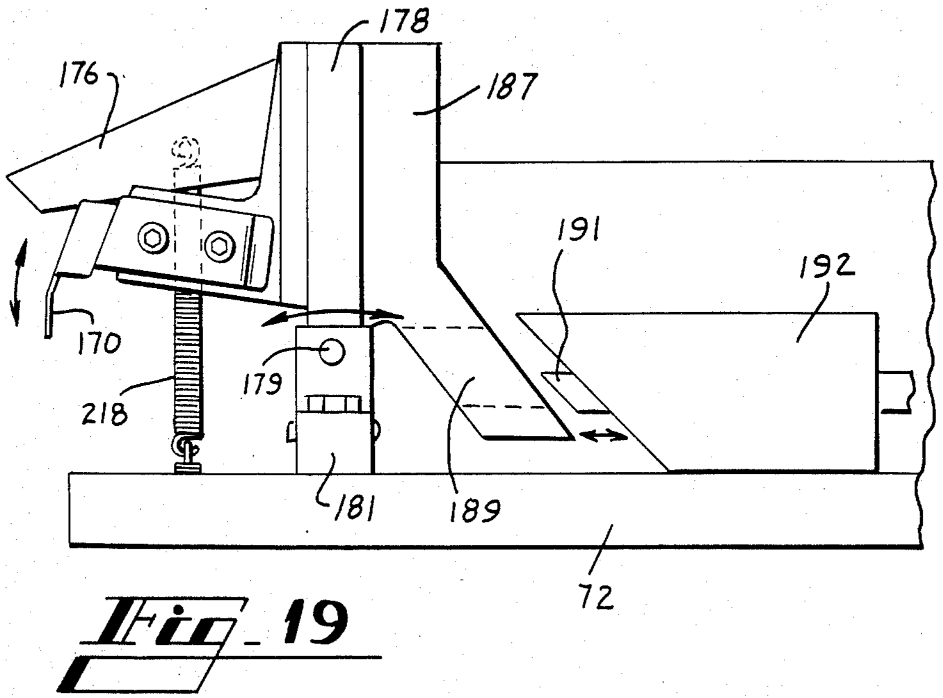
FIG. 19 is an elevational view of the transport device with portions thereof removed to show particular features.

Also of interest with respect to the wire-forming station 50 is the transport device 115. As will be recalled, the transport device 115 is designed to receive partially formed lengths 52-52 in its nest 113 and to transport them to the assembly station 60. The transport device 115 includes a gate 170 (see FIGS. 10, 11 and 18) which is movable pivotally from a closed position in engagement with the bed plate 118 to a raised position. The gate 170 must be raised to permit the partially formed contact elements 40-40 to be moved into the nest 113 (see FIG. 10) for transport to the assembly station 60. The gate 170 is caused to be opened by an air cylinder 174 (see FIGS. 8 and 18). However, should the air cylinder 174 not function, provisions have been made to cause the gate 170 to be opened as the feed member 92 is moved toward the transport device 115. As can be seen in FIG. 19, an arm 176 extends laterally from a wall 178. The wall 178 is mounted for pivotal movement about pins 179-179 which are supported in pintles 181-181. The arm 176 is adapted to engage a camming surface 183 (see FIG. 6) of a platform 185 which is movable by an air cylinder 186 (see FIGS. 1 and 8). The feed member 92 is attached to the platform 185 and hence movable therewith. As the feed member 92 is moved toward the transport device 115, the arm 176 engages and rides along the camming surface 183. This causes the wall 178 to be pivoted about the pins 179-179 and the gate 170 to be moved to an open position to allow entry of the partially formed contact elements.

Figure 11:
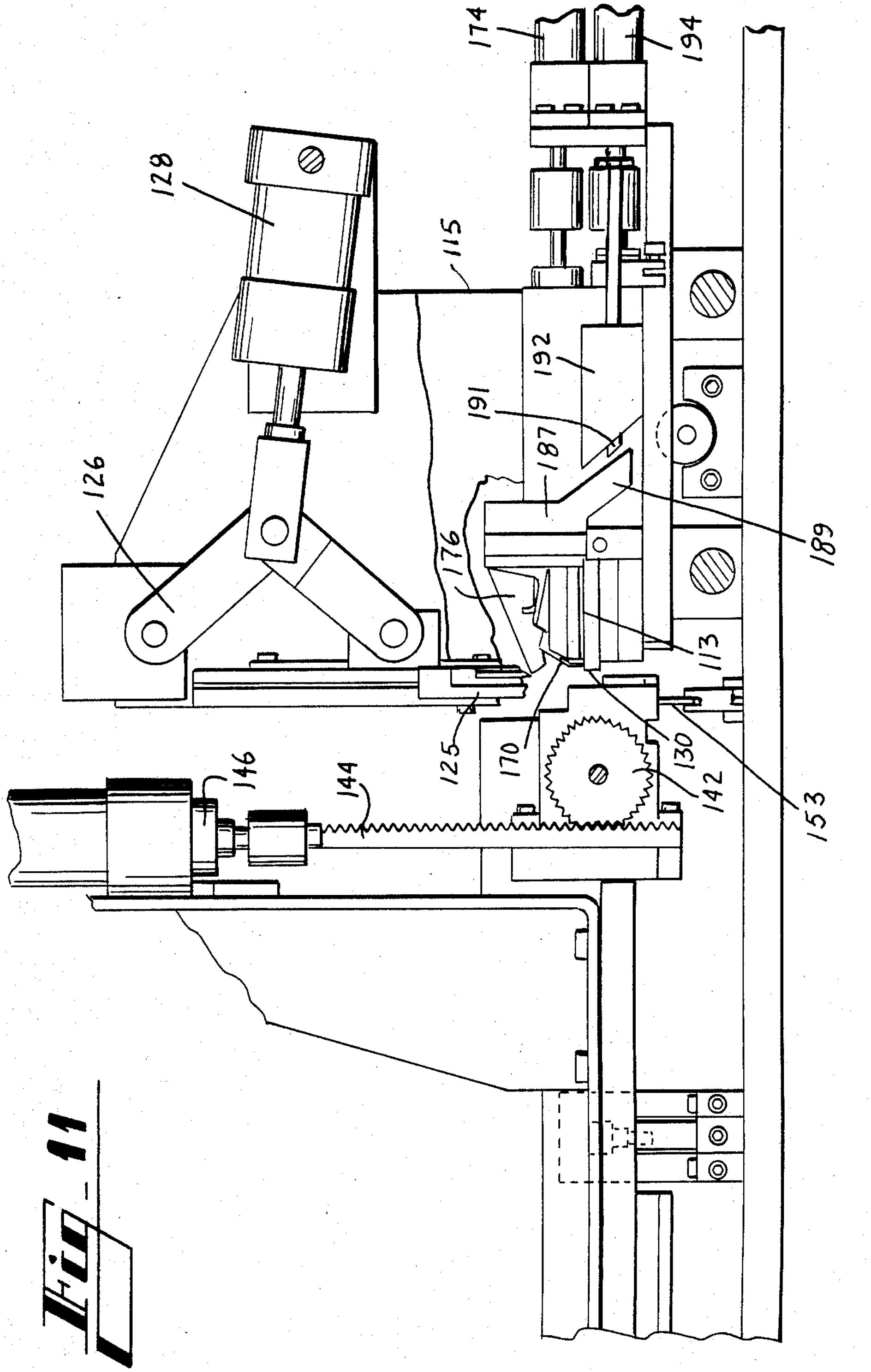
FIG. 11 is an elevational view of a portion of the wire-forming station and of the transport device as viewed from an assembly station.
Figure 12:
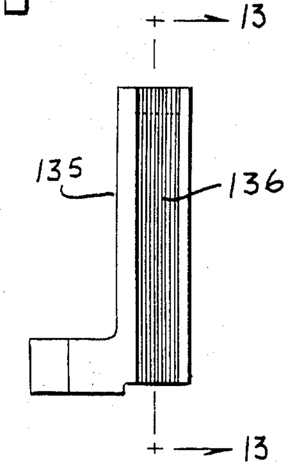
FIG. 12 is an end view of a laminated wire guide in the wire-forming station.
Figure 13A:
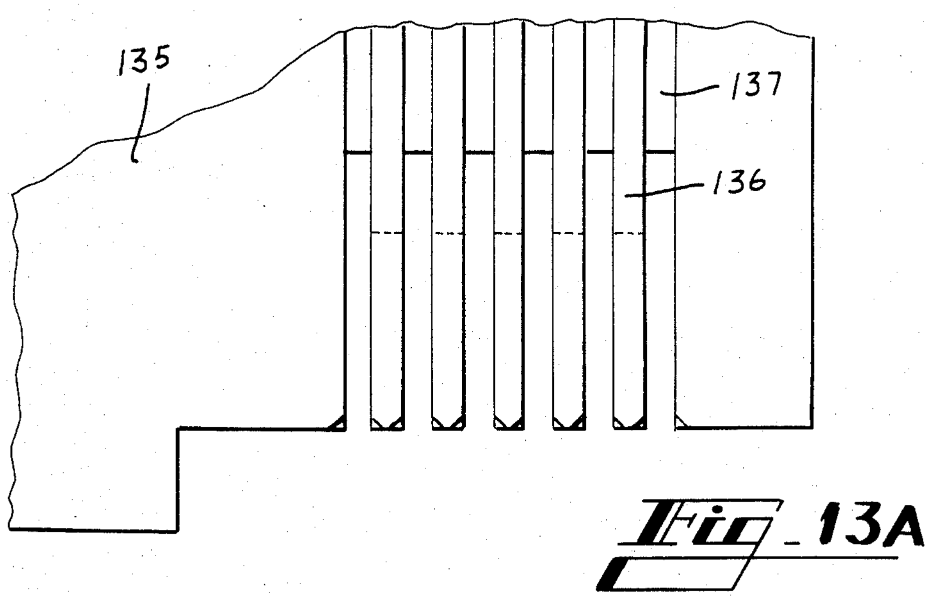
FIG. 13A is an enlarged view of a portion of the laminated wire guide of FIG. 13.

As can be seen in FIGS. 11 and 19, a vertical member 187 having an angularly extending member 189 is attached to the wall 178. The angularly extending member 189 is adapted to be engaged by a camming member 191 which is moved slidably through a guide 192 toward the gate 170 by an air cylinder 194.

Figure 10:
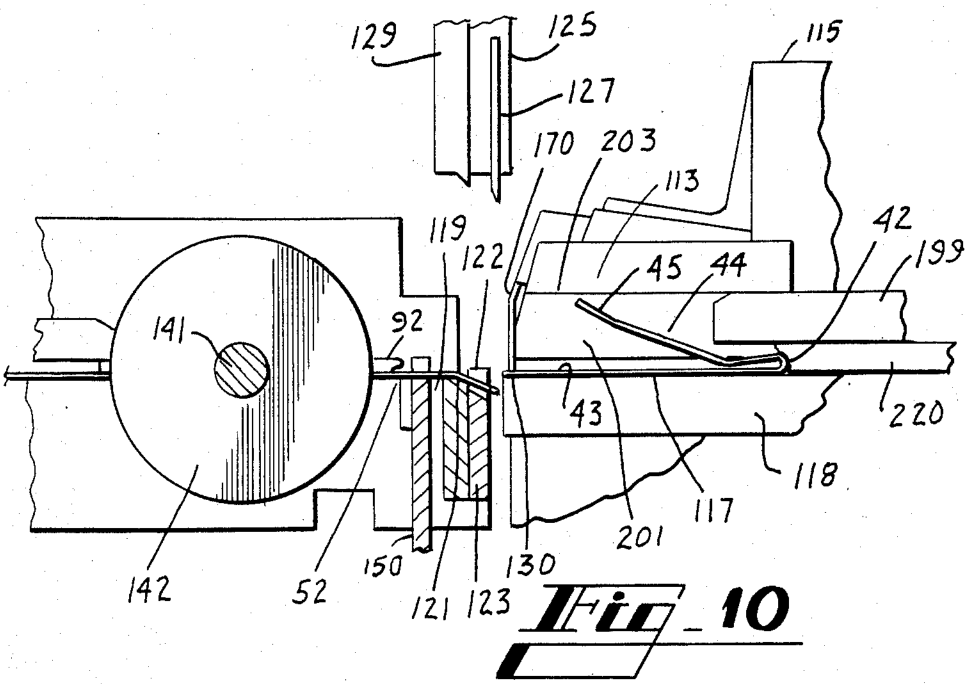
FIG. 10 is an elevational view of a portion of the wire-forming station and of the transport device.

Also, as can be appreciated from FIG. 10, the sum of the unformed length 43 and portion 46 of the partially formed contact element 40 is greater than the sum of the wire portions 45, 157 and 158. When the partially formed contact elements 40-40 are in the nest, the gate 170 when in a closed position is effective to hold the bottom portions 43-43 in engagement with the grooves of the bed plate 118 of the transport device 115. This is especially important when the shear blade 127 is retracted after having severed the wires 54-54. There is a tendency for the wires in the transport device 115 to be lifted which could result in misregistration with the adapter housing 32. The gate 170 prevents movement of the wires from the grooves of the bed plate.

Figure 20:
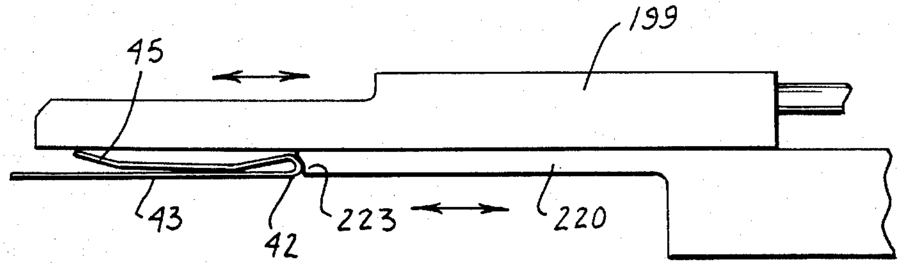
FIG. 20 is an enlarged elevational view of a portion of the transport device.

After the partially formed contact elements 40-40 have been moved into the nest 113 of the transport device 115, the leading end portions 45-45 must be depressed toward the underlying trailing end portions 46-46. This is required to facilitate insertion of both free ends of the contact element into the plug end 34 of the adapter 31. This is accomplished by operating the air cylinder 174 (see FIG. 18) which also is operatively connected to a plurality of parallel compressor blades 199-199 (see also FIG. 20). The blades are moved forward to ride along the top portions of the partially formed contact elements thereby depressing the leading end portions 45-45.

The nest 113 in which the partially formed contact elements 40-40 are received is supported on the bed plate 118 and comprises a plurality of compartments 201-201 (see FIG. 10) formed between partitions 203-203. The partitions 203-203 are spaced above the bed plate 118 to permit entry of the feed member 92. The grooves 117-117 of the bed plate 118 are aligned with the compartments. When the partially formed contact elements 40-40 are received in the nest, the lower portion of each is received in one of the grooves 117-117 and the remainder in an aligned one of the compartments 201-201. The compressor blades 199-199 are adapted to be moved in the compartments 201-201 above the partially formed contact elements.

Attached to a block 210 (see FIG. 18) are the compressor blades 199-199 and a gate actuator 212. The block 210 is moveable reciprocally by the air cylinder 174. When the apparatus 30 is prepared to transfer the partially formed contact elements to the transport device 115, the air cylinder 174 is controlled to retract the compressor blades 199-199 and the gate actuator 212. The gate actuator 212 includes a lip 216 which upon retraction engages a horizontally disposed pin (not shown) spanning across an opening in the wall 178 to cause the wall and attached gate 170 to be moved pivotally to expose the nest 113. This permits the feed member 92 to push the partially formed contact elements 40-40 into the nest 113. It should be recalled that the gate 170 normally is in a closed position through the action of a tension spring 218 (see FIG. 19). Should the apparatus 30 not be in an automatic mode and the air cylinder 174 not be operative, the movement of the platform 185 together with the feed member 92 causes the arm 176 to engage the camming surface 183 to move pivotally the wall 178 and raise the gate 170.

Figure 21:
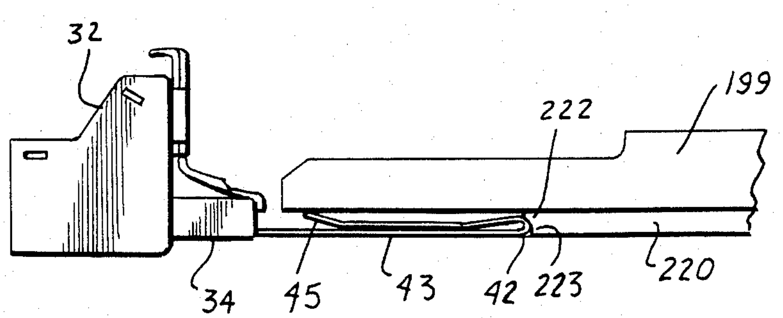
FIG. 21 is an enlarged elevational view of the portion of the transport device shown in FIG. 20 and shows an adapter in the assembly station in relation thereto.

Slidably disposed below the compressor blades 199-199 are a plurality of pusher blades 220-220 (see FIGS. 10 and 20-21) which have lower portions received in the grooves 117-117 of the bed plate 118. A leading end 222 of each pusher blade is formed with an undercut 223 for receiving the closed end 42 of an aligned partially formed contact element 40 and for maintaining the portions 43-43 in the grooves 117-117 when the portions 45-45 are depressed. The pusher blades 220-220 are used to move the partially formed contact elements 40-40 from the transport device 115 into the housing 32 in the assembly station 60. To accomplish this, the pusher blades 220-220 are mounted on a block 221 (see FIG. 18) and hence are moved by controlling the operation of the air cylinder 194.

Figure 2B:
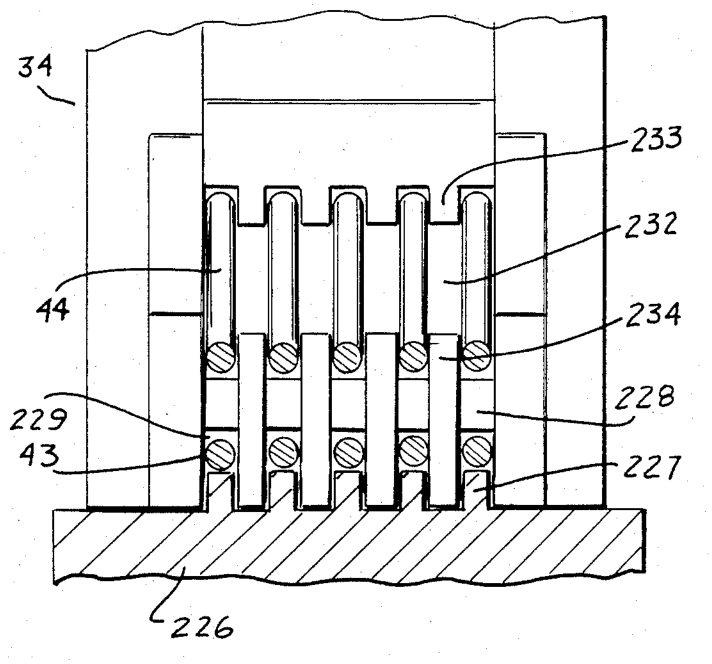
Figure 22A:
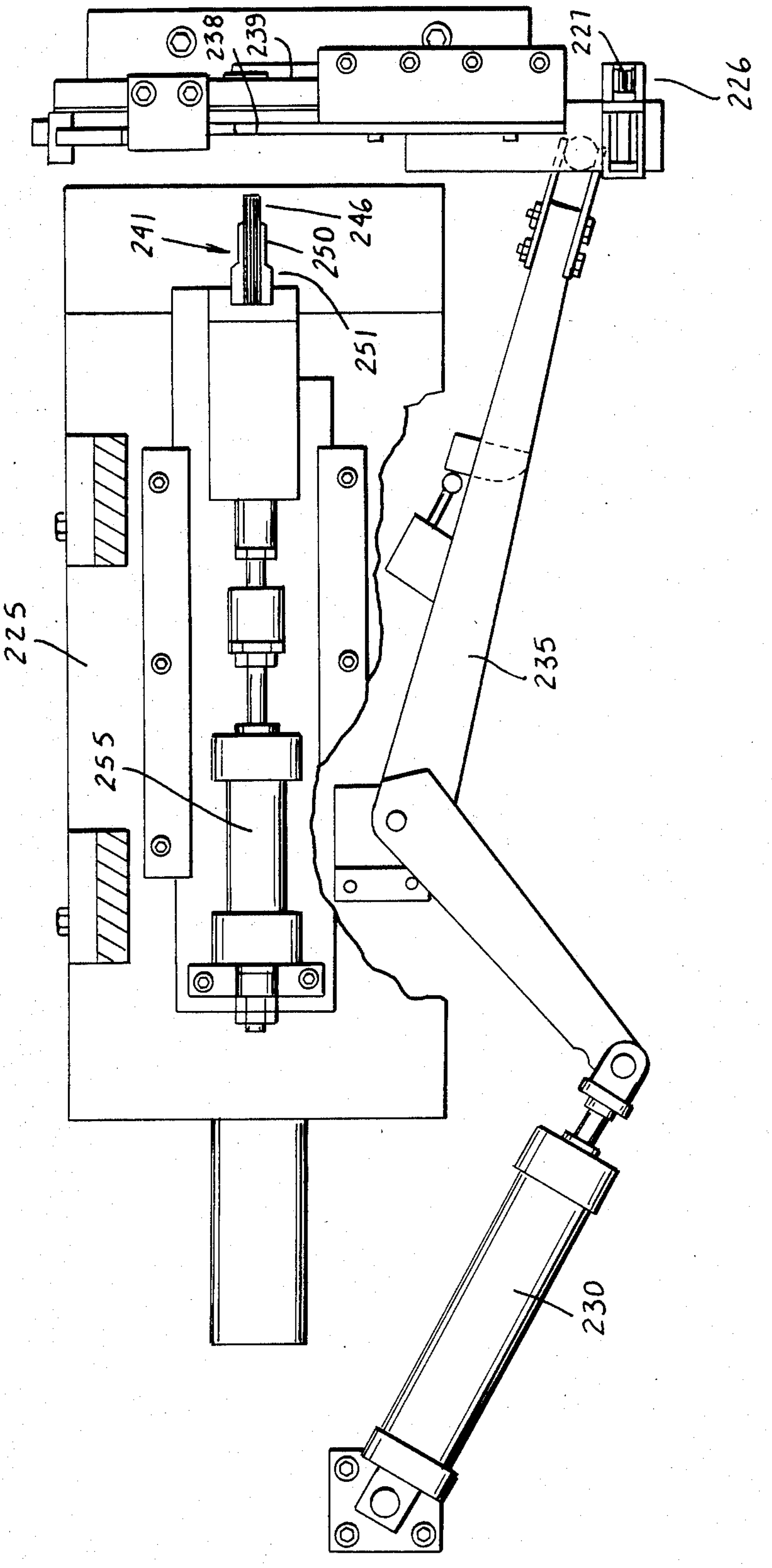
FIGS. 22A and 22B are a sequence of plan views which show the assembly station and an adapter in a load position and in an assembly position.

Turning now to the assembly station 60 which is supported on a base 225, an operator loads a plastic housing 32 into a slidably moveable socket 226 (see FIG. 22A). The socket 226 at one end is provided with a plurality of parallel ridges 227-227 which are aligned with downwardly depending walls 228-228 (see FIG. 2B) of the housing 32 at its plug end 34. Together, the ridges 227-227 and the walls 228-228 form passageways 229-229 along which the lower, linear portions 43-43 of the contact elements 40-40 move in order for the trailing free end portions 46-46 thereof to be received at the jack end 36 of the housing. As can be seen in FIGS. 2B and 4E, passageways 231-231 of the housing 32 which lead to the passageway 37 and the upper jack cavity 39 are accessed through a chamber 232 at the plug end of the housing which includes a plurality of ridges 233-233 depending from its ceiling and a plurality of ridges 234-234 which project upwardly from its floor.

Figure 22B:
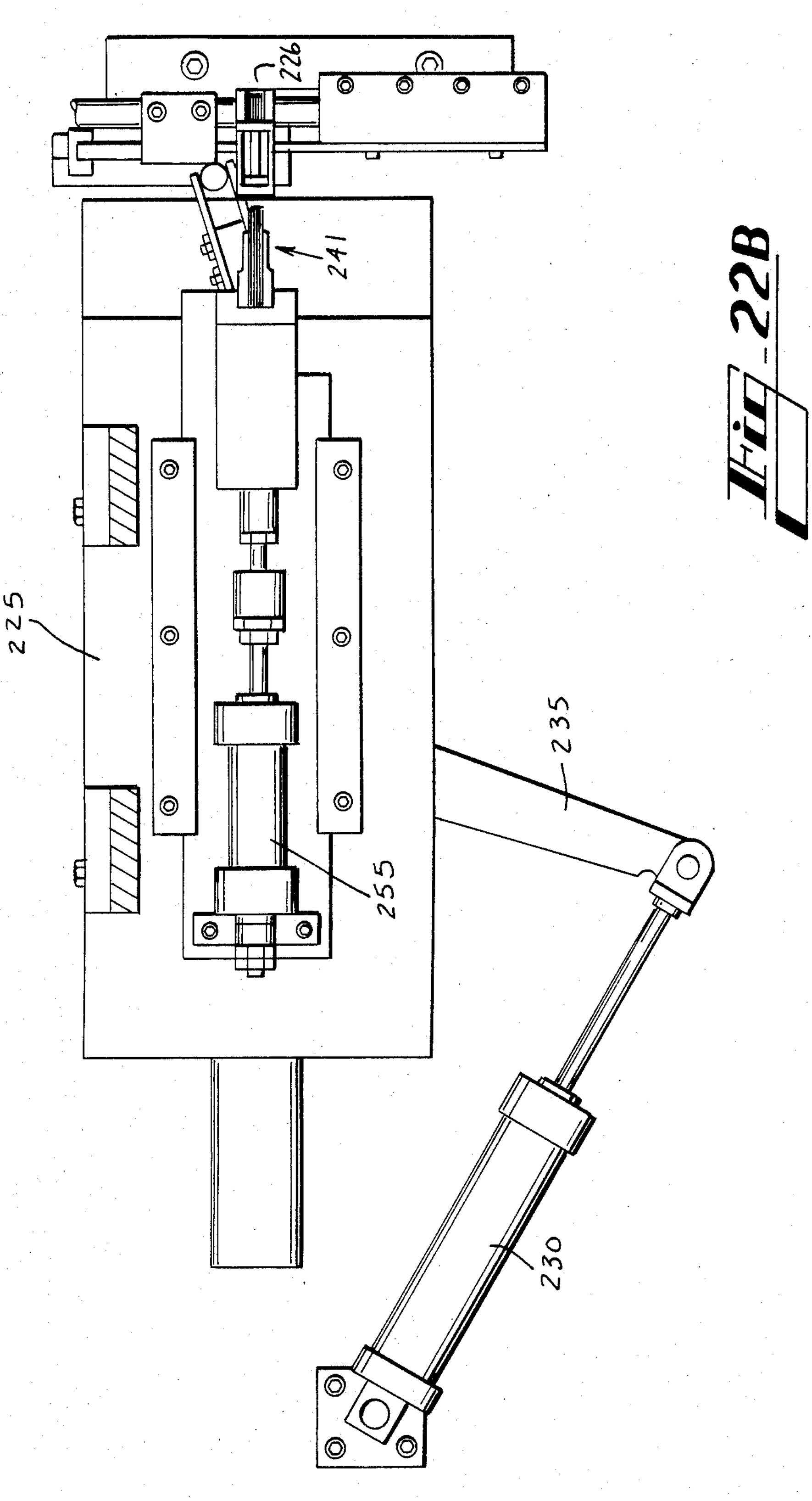

As the socket 226 is moved in a direction transverse of the wires 54-54 and parallel to the movement of the transport device 115 by an air cylinder 230 and a mechanism 235 to the position shown in FIG. 22B, the housing 32 becomes seated firmly in the socket. This is accomplished by causing portions 236 and 237 of the housing 32 to be engaged by wedging members 238 and 239 (see FIGS. 23 and 26) which present progressively decreasing clearances for those portions of the housing. As a result, the wedging members 238 and 239 apply forces to the portions 236 and 237 of the housing to seat the housing in engagement with the socket 226.

After the housing 32 has been aligned with the assembly station 60 (see FIG. 23), the apparatus 30 is controlled to assemble the partially formed contact elements 40-40 into the housing. The partially formed contact elements must be inserted to cause the free end portions to become disposed adjacent to the cavities 38 and 39 and to cause the closed end portion 42 to be disposed in the plug end 34 curled about the nose portion thereof (see FIG. 4E).

On command, the air cylinder 194 is operated to move the camming member 191 to engage a side portion of the angularly extending member 189 to move pivotally the wall 178 and raise the gate 170 out of engagement with the trailing end portions 46-46 of the partially formed contact elements 40-40. The gate 170 is raised after the pusher blades 220-220 have begun to move the partially formed contact elements 40-40 along their compartments in the nest 113 toward the adapter housing 32. The gate 170 is raised sufficiently to permit clearance of the upper free end portions 45-45 of the contact elements which have been moved out from under the compressor blades 199-199. Further, the compression on the upper portions of the contact elements is such that as the leading and trailing free end portions of the wires are moved toward the housing 32, the trailing or lower free end portions 46-46 enter the passageways 229-229 and the leading or upper free end portions 45-45 are able to be moved into the chamber 232 of the plug end 34 of the housing (see FIG. 4E). The upper free end portions 45-45 are guided by the ridges 233-233 and 234-234 (see FIG. 2B). The gate 170 remains in an open position until the partially formed contact elements 40-40 have been moved completely out of the nest 113 whereafter the air cylinder 194 is controlled to retract the pusher blades 220-220 and disengage the camming member 191 from the angularly extending member 189.

As the free end portions of the partially formed contact elements 40-40 are being fed into the housing 32, metallic wire guide and forming devices 241 and 242 (see FIGS. 23-27) are moved by the operation of an air cylinder 240 and a tandem air cylinder arrangement 245, respectively, to cause portions thereof to be moved into the housing 32. The wire guide and forming devices 241 and 242 are used to guide the partially formed contact elements and to support them during further forming.

A leading portion of the lower one 241 of the forming devices is moved into a chamber 243 (see FIGS. 2 and 2A) which extends below the lower jack cavity 38 to guide the partially formed contact elements 40-40 during their insertion and to support them as their trailing free end portions 46-46 are retroflexed. Depending from the ceiling of the chamber 243 of the housing 32 are a plurality of fins 244-244.

The wire guide and forming device 241 includes a forward end portion 246 (see FIGS. 23-27) which has a plurality of ramps 247-247 and a plurality of fingers 248-248. At free ends, each of the fingers 248-248 extends upwardly to an aligned one of the fins 244-244 (see FIG. 2A). As a result, each of the portions 43-43 of the contact elements 40-40 is received in a compartment defined by a plastic ceiling and a metallic floor and walls each comprising one of the fins 244-244.

Figure 24:
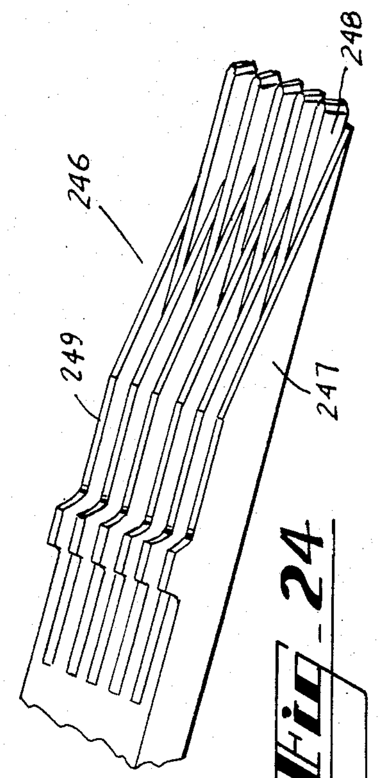
FIG. 24 is an enlarged perspective view of a portion of a wire guide and end forming tool.
Figure 25:
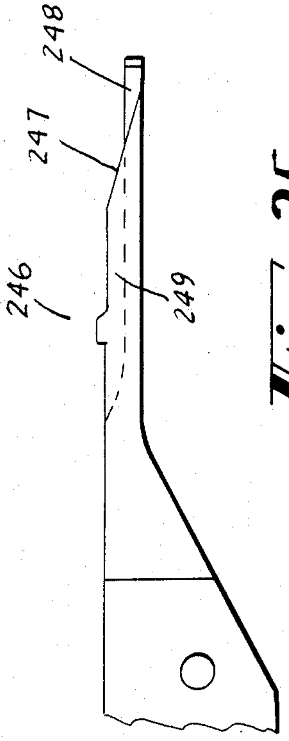
FIG. 25 is a side elevational view of the portion of the forming tool of FIG. 24.
Figure 28A:
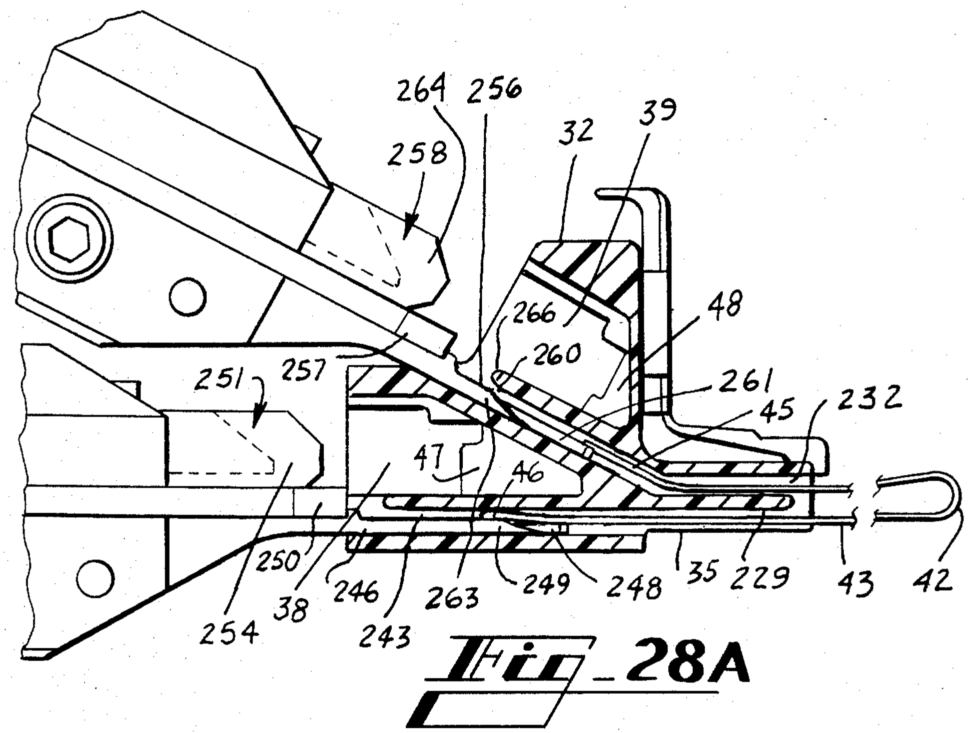
FIGS. 28A-28D are a sequence of views showing steps in the operation of the wire guide and forming tools at the assembly station.

As can be observed in FIGS. 24-25, the forming device 241 is constructed such that each of the fingers 248-248 becomes the invert of a groove and such that each of the ramps becomes a ridge 249. When the forward portion 246 of the forming member 241 is inserted into the chamber 243, it is moved inwardly continuously (see FIG. 28A) toward the passageway 35 of the housing 32 which is adjacent to the passageways 229-229. When the legs 43-43 of the partially formed contact elements 40-40 are inserted into the passageways 229-229 and into the chamber 243, they are moved along the hereinbefore-described compartments and ride upwardly along the ramps 247-247 until the trailing end portions 46-46 are received between the fins 244-244 and supported by the ridges 249-249 of the ramps.

Figure 28B:
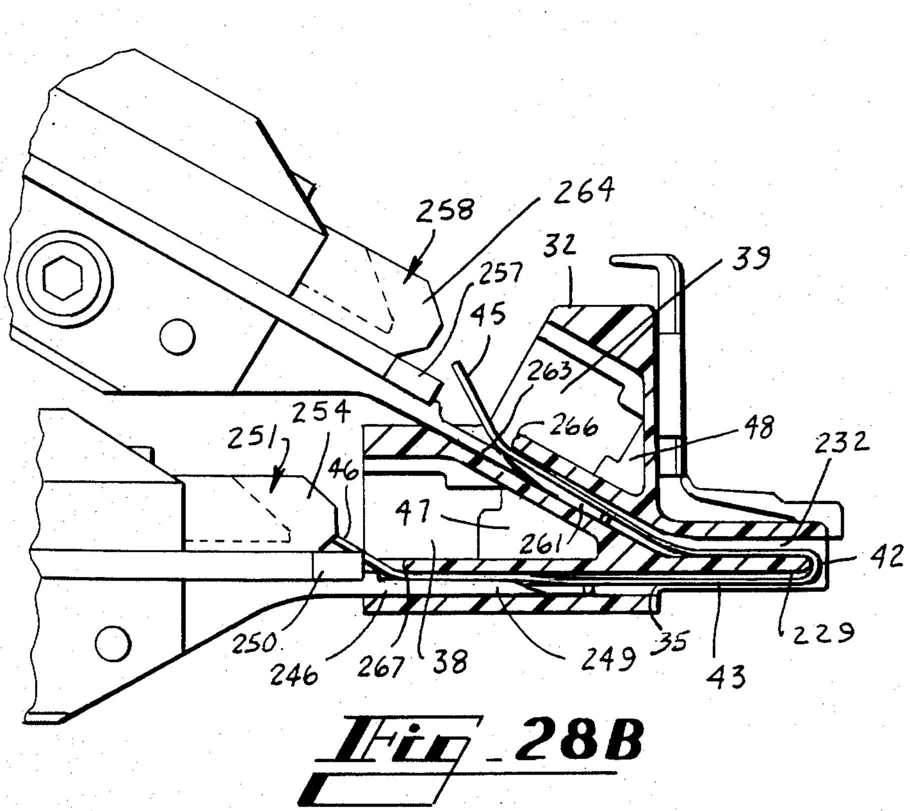
Figure 28C:
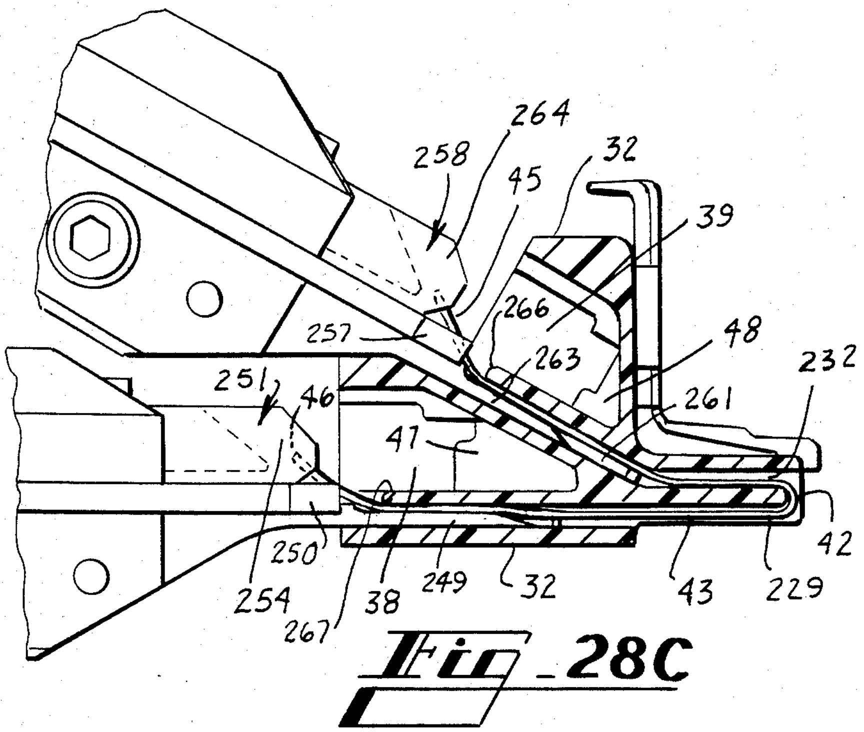

The forming device 241 also includes intermediate and forming portions 250 and 251. The intermediate portion 250 includes parallel portitions 252-242 with floors 253-253 (see FIG. 27) therebetween which slope upwardly. The intermediate portion 250 is disposed to be moved to be adjacent to the nose end of the jack cavity 38 (see FIG. 28A) such that when the lower trailing end portions 46-46 of the partially formed contact elements 40-40 are moved out from between the fins 244-244, they ride up along the sloping floors 253-253. This causes the trailing end portions 46-46 to be received between partitions 254-254 (see FIGS. 27 and 28C) of the forming portion 251.

Figure 23:
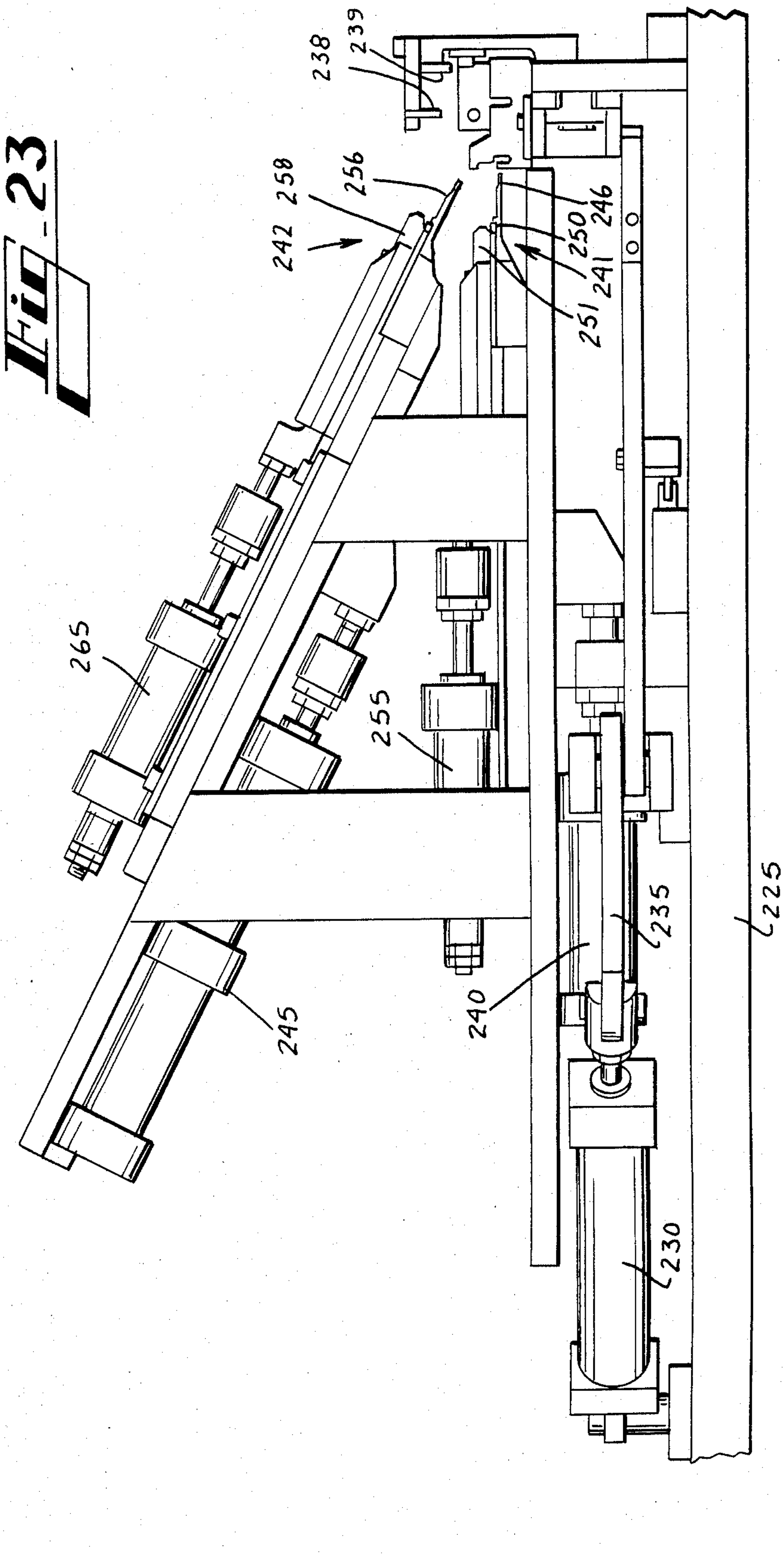
FIG. 23 is an elevational view of the assembly station which includes two wire guide and end forming tools.

The forming portion 251 is capable of being moved slidably relative to the intermediate and forward portions 250 and 246 by an air cylinder 255 (see FIG. 23). After the forward portion 246 has bottomed out in the housing 32 and the intermediate portion 250 is adjacent to the nose end of the lower cavity 38, the trailing end portions 46-46 are guided with the forming portion 251 which is capable of being moved relative to the other two portions and into the lower jack cavity 38 to turn the free end portions 46-46 about the nose end and to cause each of them to be retroflexed.

Figure 26:
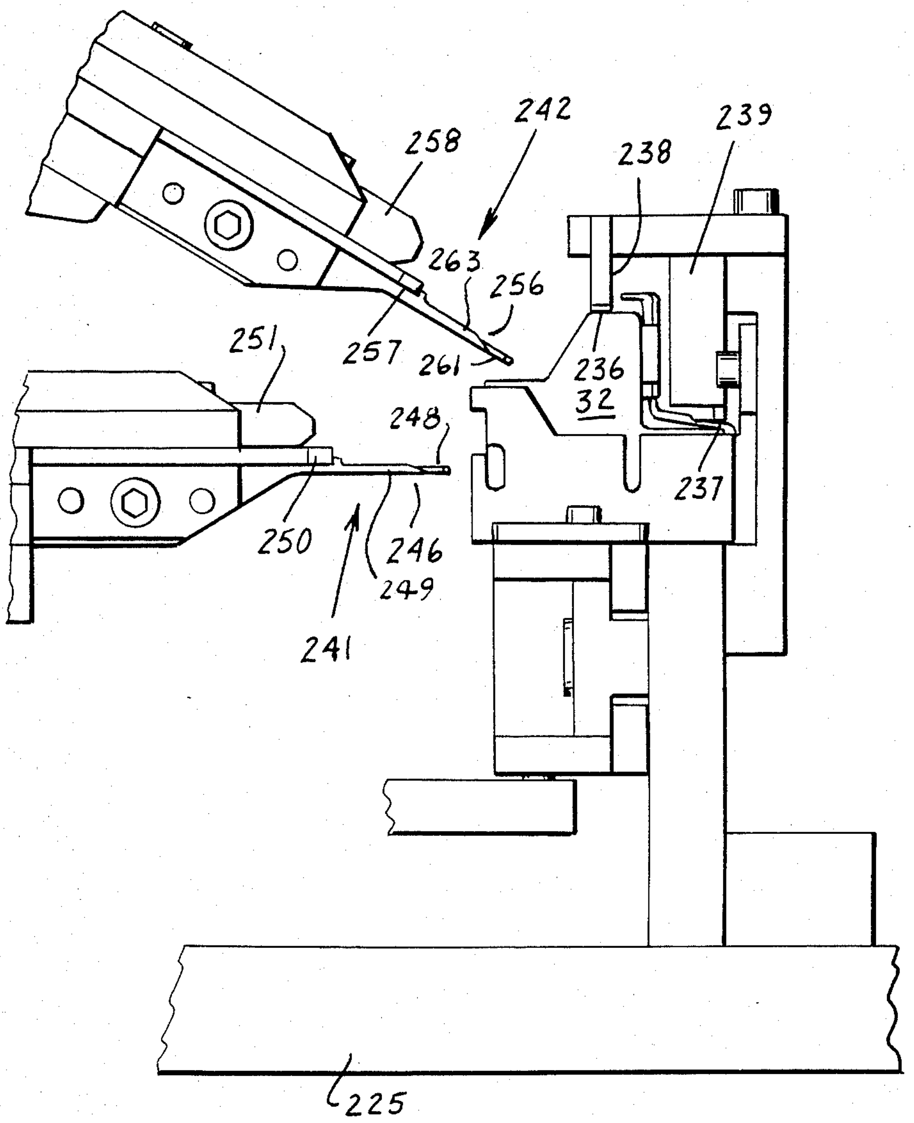
FIG. 26 is a side elevational view of a portion of the assembly station.
Figure 27:
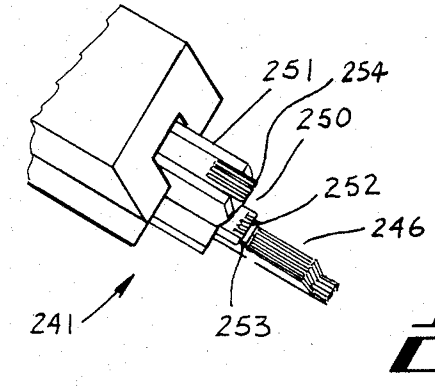
FIG. 27 is an enlarged perspective view of one of the wire-end forming tools.

It can be seen from FIGS. 23 and 26 that the tool which forms the wire end portions in the upper jack cavity 39, includes a forward portion 256, an intermediate portion 257 and a forming portion 258. The forming device 242 is moved by the tandem air cylinder arrangement 245 to cause the forward portion 256 to become positioned in a chamber 260 adjacent to the upper jack cavity 39 (see FIGS. 2 and 28A). The forward portion 256 is similar in construction to the forward portion 246 of the forming device 241. It includes a plurality of ramps and fingers 261-261 at its leading end, the fingers being designed to extend toward fins 262-262 (see FIG. 2A) depending from the ceiling of the chamber 260. As a result, the leading end portions 45-45 of the wire lengths 52-52 are moved into compartments comprising plastic ceilings and metallic floors and sidewalls each comprising one of the plastic fins 262-262. Subsequently, the end portions 45-45 and legs 44-44 are supported in engagement with ridges 263-263 (see FIGS. 28B and 28C) which extend from the ramps of the forward portion 256.

It should be noted that the movement of the portion 256 into the upper jack cavity 39 is accomplished in two stages. In a first increment of movement shown in FIG. 28A, the portion 256 is spaced from portions of the housing 32 to allow passage of the portions 45-45 of the partially formed contact elements 40-40. Otherwise, the portions 45-45 could not be moved past the restriction formed between the forward portion 256 and portions of the housing 32. After the portion 256 has been moved to its initial position, the partially formed contact elements 40-40 are inserted (see FIG. 28A).

One of the features of the inventive methods and apparatus is the initial forming of the leading end portions 45-45 of the wires. As can be observed from FIGS. 4C and 28B, that end portion of each wire length 52 is at an angle to the remainder of the leg portion 44. This additional break in the wire is provided in order to facilitate the insertion of the upper leg 44 of the contact element into the cavity 39. If the upper leg were linear without a break, it would, upon initial entry into the chamber 260 under the upper cavity 39, hug the floor of that chamber and abut the leading end portion of the forward portion 256 of the device 242. Because of the break, upon entry into the chamber 260, the portion 45 is angled sufficiently off the floor to permit the forward portion 256 of the device 242 to be positioned between it and the chamber floor. Movement of the leading end portions of the partially formed contact elements 40-40 along the ramps and the ridges 263-263 along the forward portion 256 is facilitated until they are received between the fins 262-262 and supported by the extensions of the ramps which have now become the projecting ridges 263-263. Also, it is important that the transition between the ramps and the ridges 263-263 of the forward portion 256 be adjacent to a nose end 266 (see FIG. 28B) of the upper jack cavity 39. The leading end portions 45-45 emerge from the forward portion 256, enter between partitions of the intermediate portion 257 and are ramped upwardly to be received between aligned partitions 264-264 of the forming portion 258 (see FIG. 28C). After the partially formed contact elements have been completely inserted into the housing, the forward portion 256 is moved through its second increment of travel to the position shown in FIG. 28C.

Figure 28D:
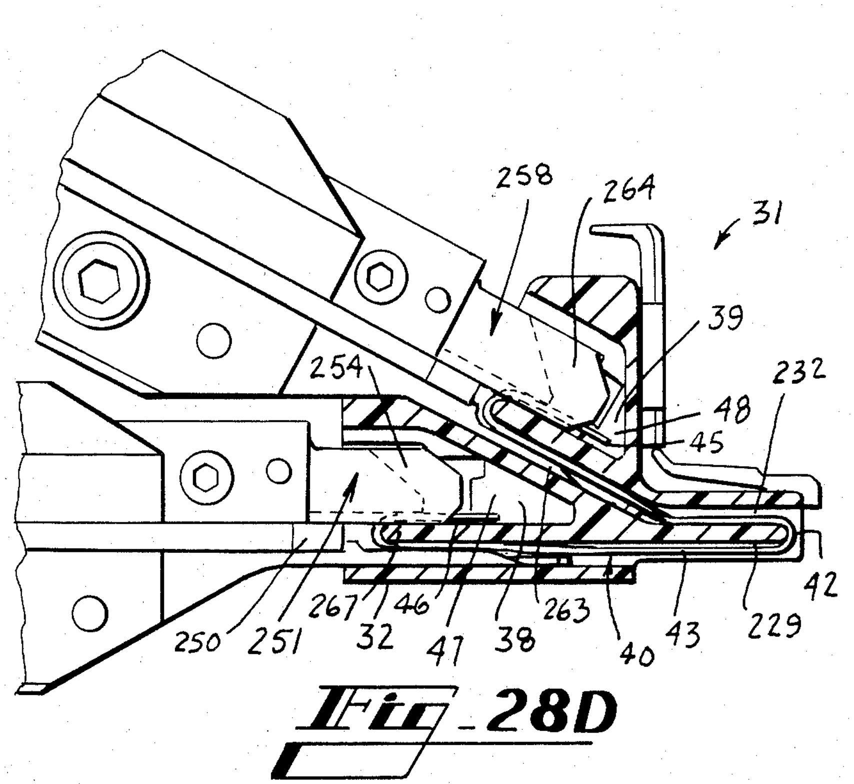

Afterwards, the wire and forming portions 258 and 251 are moved farther by an air cylinder 265 and the air cylinder 255, respectively, relative to the other portions of the devices 242 and 241. This causes the free end portions 45-45 and those extending from the lower jack cavity 38 to be retroflexed and wrapped around the nose end 266 of the upper jack cavity 39 (see FIG. 28D) and about an entrance end 267 to the lower jack cavity 38, respectively. When the forming portions 251 and 258 are inserted into the cavities 38 and 39, forward ends of their partitions 254-254 and 264-264 are adjacent to the ribs 47-47 and 48-48 of the housing cavities to insure that the trailing and leading ends are received therebetween. This completes the forming of the contact elements 40-40 and the assembly of the adapter 31. The forming devices 241 and 242 are retracted from the jack cavities 38 and 39 and the socket 226 is moved slidably to the position shown in FIG. 22A to remove the assembled adapter 31 from the assembly station 60. The operator removes the adapter 31 from the socket 226 and replaces it with another housing 32 in preparation for another cycle of operation.

It is to be understood that the above-described arrangements are simply illustrative of the invention. Other arrangements may be devised by those skilled in the art which will embody the principles of the invention and fall within the spirit and scope thereof.

What is claimed is:

1. A method of assembling a wire-like contact element and a dielectric unipartite housing having an opening in a first end which communicates with a cavity in a second end, said method including the steps of;

feeding a straight length of wire extending from a supply in a direction which extends along the length of the wire;

turning a portion of the length of wire which includes a leading free end to provide a partially formed contact element having a retroflexed configuration;

storing the partially formed contact element in a nest;

separating the partially formed contact element from the supply to cause the partially formed contact element to have a trailing free end;

causing the partially formed contact element in the nest to be aligned with the housing with the leading and trailing free ends facing the first end of the housing;

moving the partially formed contact element from the nest to cause the leading and the trailing ends of the length of wire to be moved into the first end of the housing and farther therein to cause at least one free end portion of the partially formed contact element to be disposed adjacent to the second end of the housing; and causing the at least one free end portion to have a predetermined configuration and to be disposed in the cavity at the second end of the housing.

2. A method of assembling a wire-like contact element and a dielectric unipartite housing which includes a plug end and a jack end having two cavities which communicate with the plug end, said method including the steps of:

feeding a straight length of wire extending from a supply in a first direction which extends along the length of the wire into a wire forming station;

in the wire forming station, turning a portion of the length of wire which includes a leading free end to provide a partially formed contact element having a retroflexed configuration with a closed end portion opposite to the leading free end;

moving the partially formed contact element into a nest;

separating the partially formed contact element from the supply to cause the partialy formed contact element to have a trailing end adjacent to the leading free end;

moving the partially formed contact element to an assembly station;

at the assembly station, providing a plastic housing with the plug end facing and aligned with the free ends of the partially formed contact element;

moving the partially formed contact element out of the nest in a second direction which is opposite to the first direction into the plug end of the housing and farther therein to cause each free end portion to extend into a cavity of the jack and to cause the closed end to be positioned at the plug end; and causing each free end portion to be retroflexed and to be disposed in a cavity at the jack end of the housing.

3. The method of claim 2, wherein the partially formed contact element is moved into the nest by applying forces to the closed end portion and said method also includes the step of introducing slack into the wire between the supply and the forming station so that when forces are applied to the closed end portion to move the contact element into the nest, the retroflexed configuration of the partially formed contact element is maintained.

4. The method of claim 2, wherein a plurality of the contact elements are formed from a plurality of wires extending from supplies and assembled to the housing and wherein prior to the step of separating the partially formed wires from the supplies, the wires are clamped between flexible leaves.

5. The method of claim 4, wherein the step of separating is accomplished to cause leading end portions of the wires to be inclined to the longitudinal axes of the wires.

6. The method of claim 5, wherein subsequent to the step of separating, the wires are caused to be moved above a plane of feed of the plurality of wires and to be held spaced apart.

7. The method of claim 5, wherein the nest into which the partially formed lengths of wires are moved maintains the wires spaced apart and wherein prior to the removal of the partially formed contact elements from the nest, the leading free end of each wire is moved toward and held adjacent to the trailing free end.

8. The method of claim 7, wherein the partially formed contact elements are pushed from the nest into the plug end of the housing with the nest being sufficiently close to the plug end of the housing so that as the leading free end of each length of wire leaves the nest and is allowed to begin to spring-return toward an initial position, it is received in the plug end of the housing.

9. The method of claim 8, which also includes the step of providing guide paths for the portions of the partially formed contact elements between the free ends and the closed ends as they are being moved through the housing.

10. The method of claim 9, which also includes the step of applying forces to each free end portion of each length of wire to cause it to be retroflexed and to be disposed in a cavity while providing lateral support for portions adjacent to the free end portions.

11. An apparatus for assembling a wire-like contact element with a dielectric unipartite housing having an opening in a first end which communicates with a cavity in a second end, said apparatus including:

a base;

means supported on said base for feeding a straight length of wire extending from a supply;

means supported on said base for turning a portion of the length of wire which includes a leading free end to provide a partially formed contact element having a retroflexed configuration;

nest means mounted on said base for receiving the partially formed contact element;

socket means mounted on said base for holding a housing;

means adjacent to said nest means and mounted on said base for separating the partially formed contact element from the supply to cause the partially formed contact element to have a trailing free end;

means mounted on said base and adapted to facilitate relative motion between said nest means and said socket means for causing the partially formed contact element in the nest means to be aligned with the housing which is held in said socket means with the leading and trailing free ends facing the first end of the housing;

means supported from said base and adapted to be moved relative to said nest means when the partially formed contact element in said nest means is aligned with the housing in said socket means for moving the partially formed contact element out of the nest means and into the first end of the housing and farther therein to cause at least one free end portion of the partially formed contact element to be disposed at the second end of the housing; and means supported from said base and including forming means and being rendered effective after the partially formed contact element has been moved out of said nest means into the housing for causing the at least one free end portion to have a predetermined configuration and to be disposed in the cavity at the second end of the housing.

12. An apparatus for forming a wire-like contact element and for assembling the contact element to a plastic unipartite housing having a plug end which communicates with a jack end having two cavities, said apparatus including:

a base;

feeding means supported from said base for moving a straight length of wire extending from a supply into a wire-forming station;

a forming device supported from said base at the wire-forming station for turning a portion of the length of wire which includes a leading free end to provide a partially formed contact element having a retroflexed configuration with a closed end portion and the leading free end at opposite ends thereof;

means supported from said base and operated subsequent to the turning of the portion of the length of wire by said forming device for separating the partially formed contact element from the supply of wire to cause the partially formed contact element to have a trailing free end adjacent to the leading free end;

transport means supported from said base and including a nest adapted to receive the partially formed contact element and for moving it from the wire-forming station to an assembly station, said separating means being disposed between said forming device and said transport means;

socket means supported from said base for holding a housing in the assembly station in alignment with said nest;

pushing means mounted in said transport means and responsive to the positioning of a housing and said transport means in the assembly station for moving the partially formed contact element from said nest into the aligned housing to cause each free end portion to extend into a cavity of the jack end and to cause the closed end to be positioned at the plug end;

first wire end forming means supported from said base and disposed in said assembly station for supporting the trailing end portion of the partially formed contact element as the contact element is moved into the housing and for causing the trailing end portion to be retroflexed and disposed in one of the cavities; and second wire end forming means supported from said base and disposed in said assembly station for supporting the leading end portion of the partially formed contact element as the contact element is moved into the housing and for causing the leading end portion to be retroflexed and disposed in the other cavity.

13. The apparatus of claim 12, wherein a plurality of lengths of wire are fed from supplies and said feeding means includes means along said base between said forming device and said supplies for introducing slack into each of the wires between the supplies and said forming device.

14. The apparatus of claim 12, wherein a plurality of lengths of wires are fed from supplies and which also includes means disposed along said base between the supplies and said forming device for clamping the plurality of wires between the supplies and said forming device.

15. The apparatus of claim 14, wherein said clamping means includes a plurality of flexible leaves extending upwardly from said base with each one of the wires received between two adjacent leaves, means for moving each leaf toward each adjacent leaf, and means disposed adjacent to an outer one of said leaves responsive to the operation of said clamping means for providing support to the outer one of said leaves.

16. The apparatus of claim 15, wherein said means for providing support is mounted pivotally on said base to maintain said leaves parallel to one another.

17. The apparatus of claim 16, which also includes a trackway being supported from said base and having a plurality of grooves with each wire being received in one of said grooves, and a U-shaped slide which is supported from said base, which straddles said leaves and which spans across said wires on each side of said leaves.

18. The apparatus of claim 14, wherein said feeding means includes a plurality of grooves along which the wires are fed, said apparatus including a toothed wire guide portion adjacent to said means for separating the partially formed contact elements from the supply and disposed between said forming device and said nest for holding the wires spaced apart, said wire guide portion including a plurality of teeth which are spaced apart to have a wire positioned between each two adjacent teeth and a surface adjacent to said toothed wire guide portion which slopes downwardly in the direction of feed of the wires.

19. The apparatus of claim 18, wherein said wire guide portion is disposed between said surface and said clamping means for slidable movement with respect to said base, said wire guide portion being moved slidably upwardly subsequent to the separating of the leading end portions of the wires to move the end portions of the wires upwardly and said separating means also including a tool which cooperates with said surface that slopes downwardly to cause the leading end portion of each contact element to be bent downwardly.

20. The apparatus of claim 19, which also includes a laminated wire guide being disposed between said toothed wire guide portion and said clamping means and being supported from said base, said laminated wire guide having a plurality of compartments each adapted to receive a portion of a length of wire which includes the leading end portion and a plurality of ribs projecting from said wire guide portion between partitions of said laminated wire guide, and said apparatus further includes means supported rotatably from said base and extending through said laninated guide for engaging leading end portions of the wires and for causing them to be turned about said feeding means into said compartments and then rearwardly toward the supplies to provide partially formed contact elements each comprising a length of wire having a retroflexed configuration.

21. The apparatus of claim 20, wherein said feeding means includes a nose end about which the leading end portions of the lengths of wire are bent, said feeding means being capable of being moved toward said transport means to move the lengths of wire into said nest.

22. The apparatus of claim 21, wherein said nest includes a plurality of compartments which in the wire forming station are aligned with said grooves in said feeding means, and said transport means also includes a gate which normally covers an entrance to said nest, said gate being attached to a wall mounted on said transport means which is mounted pivotally, said wall including an opening having a pin spanning thereacross.

23. The apparatus of claim 22, which also includes a slidably mounted hook-shaped member disposed above said nest and mounted on said transport means, and first means mounted on said transport means for moving said hook-shaped member prior to and in the direction of the movement of said feeding means, said first means for moving said hook-shaped member being operated to move said hook-shaped member to engage said pin and move pivotally said wall and said gate to expose said compartments of said nest.

24. The apparatus of claim 23, which also includes spring means mounted on said transport means for closing said gate and a plurality of compressor blades disposed in said nest in said transport means and a plurality of pusher blades positioned between grooves in said nest along which the lengths of wire are fed and said compressor blades in said nest, said compressor blades being connected to said first means so that when said hook-shaped member is returned toward said gate, said spring means is rendered effective to close said gate, and said compressor blades are moved toward said farming station to move the leading end portions of the lengths of wire toward the trailing end portions thereof.

25. The apparatus of claim 24, which also includes means supported from said base for moving the socket means which holds the plastic housing from a load position to the assembly station, said apparatus further including means supported by said base for moving said transport means into alignment with the assembly station and the housing.

26. The apparatus of claim 25, which also includes second means attached to said pusher blades for causing said blades to engage the closed end portions of the partially formed contact elements to move the partially formed contact elements into the housing in the assembly station, said second means also including means for causing said gate to be opened to allow the partially formed contact elements to be moved into the housing.

27. A device for clamping a plurality of side-by-side wires being fed from supplies, said device including:

a plurality of relatively flexible leaves being spaced apart and projecting from a common support, each wire of the plurality extending between two adjacent leaves;

anvil means adjacent to one of the outer ones of said plurality of leaves;

means aligned with said anvil means for applying forces to the other outer one of said plurality of leaves to move adjacent ones of said leaves toward each other and toward said anvil means to clamp the wires therebetween; and stabilizing means spanning across the plurality of wires and said anvil means for holding the wires disposed in a plane between said leaves.

28. The device of claim 27, wherein said stabilizing means straddles said leaves.

* * * * *